(12) United States Patent
Lee et al.

(10) Patent No.: US 9,996,722 B2
(45) Date of Patent: Jun. 12, 2018

(54) BIOMETRIC FEATURE IDENTIFICATION DEVICE AND METHOD

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 105 days.

(21) Appl. No.: 15/136,408

(22) Filed: Apr. 22, 2016

(65) Prior Publication Data

US 2016/0314332 A1    Oct. 27, 2016

(30) Foreign Application Priority Data

Apr. 24, 2015   (TW) .............................. 104113181 A
Oct. 6, 2015    (TW) .............................. 104132798 A

(51) Int. Cl.
*G06K 9/00*        (2006.01)
(52) U.S. Cl.
CPC .................................. *G06K 9/0002* (2013.01)

(58) Field of Classification Search
CPC ..... G01R 27/2605; G01R 31/028; G01D 5/24
See application file for complete search history.

(56) References Cited

U.S. PATENT DOCUMENTS

| | | | |
|---|---|---|---|
| 2007/0002009 A1* | 1/2007 | Pasch ................. | G02B 26/0841 345/108 |
| 2009/0010644 A1* | 1/2009 | Varshneya .............. | G01S 7/481 398/33 |
| 2014/0253613 A1* | 9/2014 | Gilbert ................ | G02F 1/13338 345/697 |

* cited by examiner

*Primary Examiner* — Jermele M Hollington
*Assistant Examiner* — Alvaro Fortich
(74) *Attorney, Agent, or Firm* — Muncy, Geissler, Olds & Lowe, P.C.

(57) ABSTRACT

A biometric feature identification device includes a substrate, an electrode layer, and a switch and trace layer. The electrode layer is arranged at one side of the substrate and has a plurality of electrodes. The switch and trace layer has a plurality of switches and a plurality of traces. The switches are provided to divide the plurality of electrodes sequentially or dynamically into at least one sensing electrode group and a plurality of deflection electrode groups corresponding thereto. Each sensing electrode group corresponds to at least two deflection electrode groups. Each sensing electrode group has at least one electrode for sensing. Each deflection electrode group has a plurality of electrodes for deflection.

37 Claims, 34 Drawing Sheets

BIOMETRIC FEATURE IDENTIFICATION DEVICE AND METHOD

BACKGROUND OF THE INVENTION

1. Field of the Invention

The present invention relates to the technical field of sensing devices and, more particularly, to a biometric feature identification device and method.

2. Description of Related Art

With development of electronic commerce, remote payments have been developed with giant strides, and thus the commercial requirement for biometric feature identification is rapidly expanded. The biometric feature identification technologies can be divided into fingerprint identification, iris identification, DNA identification, and the like. For the efficient, safe, and non-intrusive considerations, the fingerprint identification becomes the first choice. The fingerprint identification technique includes optical, thermal sensing, ultrasonic, and capacitive approaches and, upon considering the device volume, cost, power-saving, reliability and anti-counterfeit, the capacitive approach is the most outstanding one.

Typically, the capacitive fingerprint identification can be further divided into the types of linear swiping scan and full area detection, wherein the full area detection is better due to its high resolution, efficiency, and convenience. However, due to very small sensing signal and its complicated and huge ambient noises, the full area fingerprint recognition is typically implemented by combining the sensing electrodes and sensing circuits into one IC chip using a protective sapphire film with a thickness smaller than 100 μm to protect the sensing electrodes. With such an implementation, the material cost and the packaging cost are quite high, and the product's lifetime and tolerance is unsatisfactory. Thus, the industry has attempted to increase the sensing sensitivity and the signal to noise ratio (SNR) for increasing the sensing distance between the sensing electrodes and the fingerprint to the utmost, so as to facilitate packaging the sensing IC or directly dispose the sensing electrodes under a protective glass for sensing. Furthermore, it is also desired to dispose the sensing electrodes on a substrate rather than an IC for greatly reducing the chip area, and to further integrate the sensing electrodes to the underside of the protective glass or even integrate the sensing electrodes into a display panel, so as to greatly reduce the cost and increase the product's lifetime and tolerance.

Therefore, it is desirable to provide an improved biometric feature identification device and method for mitigating and/or obviating the aforementioned problems.

SUMMARY OF THE INVENTION

The object of the present invention is to provide a biometric feature identification device, which uses a plurality of selection switches to divide a plurality of electrodes sequentially or dynamically into at least one sensing electrode group to which sensing signal is applied, and a plurality of corresponding deflection electrode groups to which sensing enhanced deflection signal and sensing suppressed deflection signal are respectively applied, thereby raising the sensing sensitivity and SNR and increasing the stability and correctness. The present biometric feature identification device can be integrated with related sensing circuits into an IC, and thus it is more suitable for arranging the sensing electrodes and selection switches on a non-IC substrate so as to separate them from the related sensing circuits thereby reducing the chip area, simplifying the packaging process, and relatively lowering the device cost.

According to a feature of the present invention, there is provided a biometric feature identification device, which includes: a substrate; an electrode layer arranged at one side of the substrate and having a plurality of electrodes; and a switch and trace layer including a plurality of selection switches and a plurality of traces, the selection switches dividing the electrodes sequentially or dynamically into at least one sensing electrode group and a plurality of deflection electrode groups corresponding thereto, wherein each sensing electrode group corresponds to at least two deflection electrode groups, each sensing electrode group has at least one electrode for sensing, and each deflection electrode group has a plurality of electrodes for deflection.

According to another feature of the present invention, there is provided a biometric feature identification method executed in a biometric feature identification device having a plurality of electrodes arranged on a sensing plane in rows and columns, a plurality of selection switches connected to the electrodes respectively, and a fingerprint sensing control circuit for switching the selection switches to control connections between the electrodes and a sensing circuit and between the electrodes. The method comprises: the fingerprint sensing control circuit dividing the electrodes through the selection switches sequentially or dynamically into at least three blocks, the three blocks being a sensing block, a deflection focusing block, and a convergence stability block, wherein the deflection focusing block is comprised of electrodes surrounding the sensing block, and the convergence stability block is comprised of electrodes surrounding the deflection focusing block; the fingerprint sensing control circuit applying a sensing stimulation signal to electrodes of the sensing block; the fingerprint sensing control circuit applying a deflection focusing signal with the same phase as that of the sensing stimulation signal to the electrodes of the deflection focusing block; and the fingerprint sensing control circuit applying a convergence stability signal with a phase opposite to that of the sensing stimulation signal to the electrodes of the convergence stability block for detecting a fingerprint signal.

According to a further feature of the present invention, there is provided a biometric feature identification method executed in a biometric feature identification device having a plurality of electrodes arranged on a sensing plane in rows and columns, a plurality of selection switches connected to the electrodes respectively, and a fingerprint sensing control circuit for switching the selection switches to control connections between the electrodes. The method comprises: the fingerprint sensing control circuit dividing the electrodes through the selection switches sequentially or dynamically into at least four blocks, the four block being a sense receiving block, a first deflection focusing block, a second deflection focusing block, and a sense transmitting block, wherein the first deflection focusing block is comprised of electrodes surrounding the sense receiving block, the second deflection focusing block is comprised of electrodes surrounding the first deflection focusing block, and the sense transmitting block is comprised of electrodes surrounding the second deflection focusing block; the fingerprint sensing control circuit applying a sensing stimulation signal to the electrodes of the sense transmitting block; the fingerprint sensing control circuit applying a deflection focusing signal with the same phase as that of the sensing stimulation signal to the electrodes of the second deflection focusing block; the fingerprint sensing control circuit applying a reference voltage or grounding signal to the electrodes of the first deflection focusing block; and the fingerprint sensing control circuit inputting a sensing signal on electrodes of the sense receiving block to a detection circuit for detecting a fingerprint signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
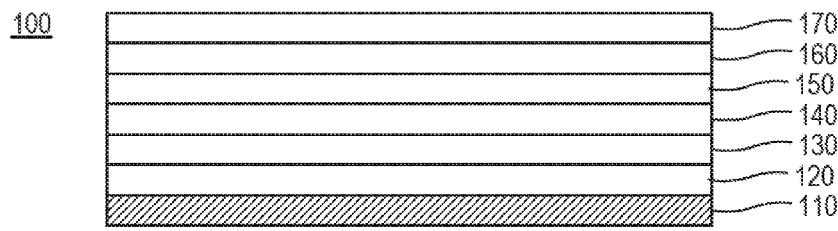
FIG. 1(A) is a stacked diagram of a biometric feature identification device according to the invention.

FIG. 1(A) is a stacked diagram of a biometric feature identification device 100 according to the invention. The biometric feature identification device 100 includes a substrate 110, a switch and trace layer 120, a first insulating layer 130, an electrode shielding layer 140, a second insulating layer 150, an electrode layer 160, and a protection layer 170.

The substrate 110 is preferably made of glass, polymer film, metal, silicon, or silicide. The electrode layer 160 is arranged at one side of the substrate 110 and has a plurality of electrodes.

Figure 1B:
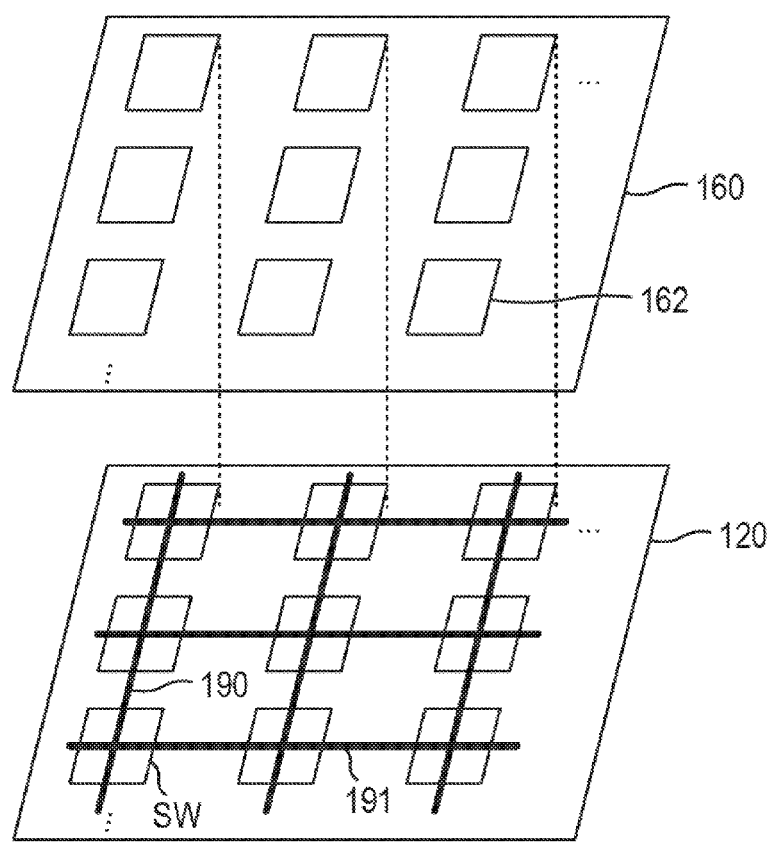
FIG. 1(B) schematically illustrates a switch and trace layer relative to an electrode layer according to the invention.

The switch and trace layer 120 is arranged at one surface of the substrate 110. FIG. 1(B) schematically illustrates the switch and trace layer 120 relative to the electrode layer 160 according to the invention. In FIG. 1(B), the switch and trace layer 120 has a plurality of selection switch groups SW arranged in a matrix form and a plurality of traces 190, 191 arranged in rows and columns. Each longitudinal trace 190 passes through one column of selection switch groups SW, and each latitudinal trace 191 passes through one row of selection switch groups SW. The electrode layer 160 includes a plurality of electrodes arranged in a matrix form. As shown in FIG. 1(B), the electrodes 162 are disposed respectively relative to the selection switch groups SW. In this embodiment, as to be described in detail hereinafter, the selection switch groups are comprised of a plurality of switches capable of sequentially or dynamically dividing the electrodes 162 into at least one sensing electrode group and a plurality of deflection electrode groups corresponding thereto. Each sensing electrode group corresponds to at least two deflection electrode groups. Each sensing electrode group has at least one electrode 162 for sensing. Each deflection electrode group has a plurality of electrodes 162 for deflection.

The first insulating layer 130 is disposed one surface of the switch and trace layer 120. The electrode shielding layer 140 is arranged between the electrode layer 160 and the switch and trace layer 120 and also disposed at one surface of the first insulating layer 130. The second insulating layer 150 is arranged between the electrode layer 160 and the electrode shielding layer 140 and also disposed at one surface of the electrode shielding layer 140. The electrode layer 160 is disposed at one surface of the second insulating layer 150. The protection layer 170 is disposed at one surface of the electrode layer 160. In other embodiments, the second insulating layer and the electrode shielding layer can be omitted. In other embodiments, the positions of the electrode layer 160 and the switch and trace layer 120, as shown in FIG. 1(A), are exchanged. In other embodiments, the substrate 110 is an integrated circuit substrate, and the switch and trace layer and related sensing circuits are integrated into one layer.

Figure 2:
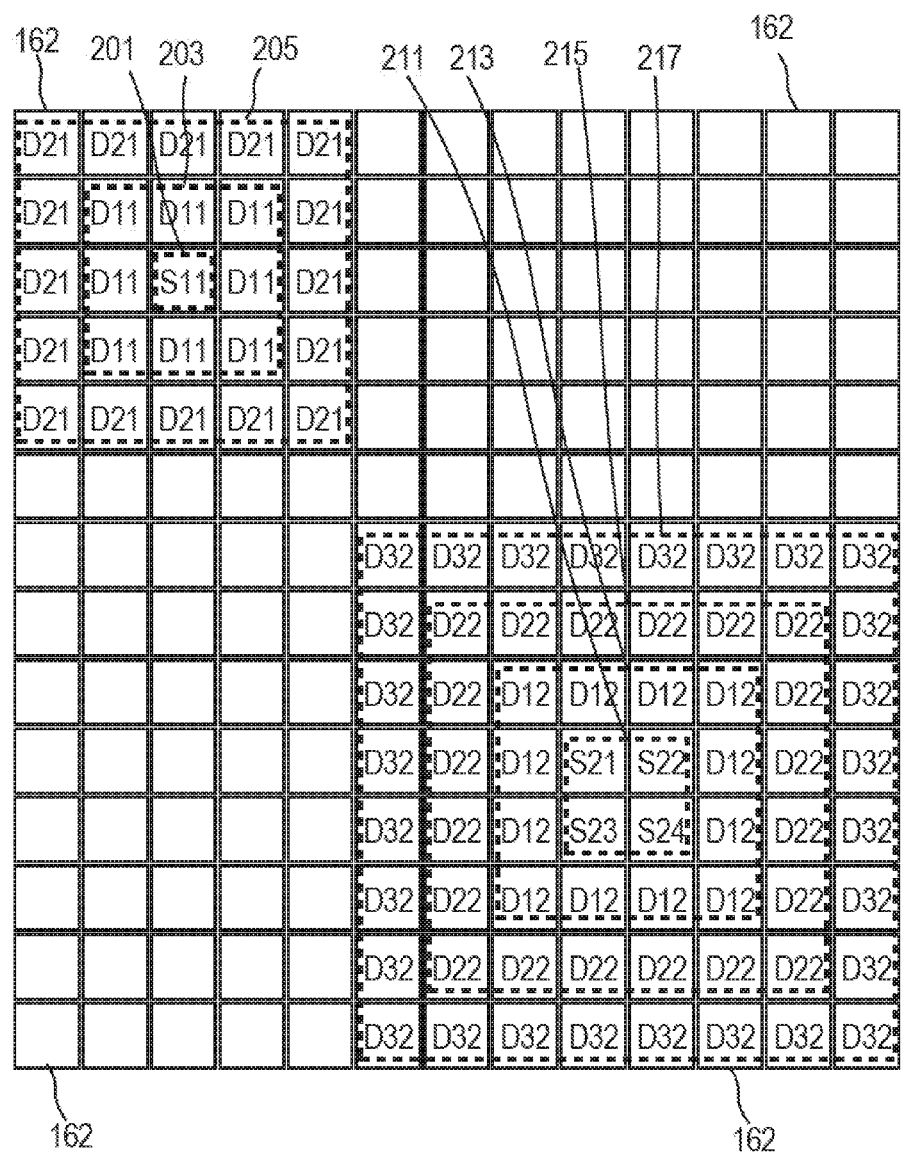
FIG. 2 is a schematic diagram of an electrode layer according to the invention.

FIG. 2 is a schematic diagram of the electrode layer 160 according to the invention. In FIG. 2, the electrodes 162 of the electrode layer 160 are divided sequentially or dynamically into at least one sensing electrode group (S) and a plurality of deflection electrode group (D) corresponding thereto. Each sensing electrode group corresponds to at least two deflection electrode groups. Each sensing electrode group has at least one electrode 162 for sensing. Each deflection electrode group has a plurality of electrodes 162 for deflection. As shown in FIG. 2, there are two sensing electrode groups in the electrode layer 160, the first sensing electrode group 201 consisting of an electrode S11 and the second sensing electrode group 211 consisting of electrodes S21, S22, S23, S24. Namely, each sensing electrode group has at least one electrode 162 for sensing.

A first deflection electrode group corresponding to a sensing electrode group is comprised of a plurality of electrodes 162 surrounding the sensing electrode group. A second deflection electrode group corresponding to the first deflection electrode group is comprised of a plurality of electrodes 162 surrounding the first deflection electrode group. A third deflection electrode group corresponding to the second deflection electrode group is comprised of a plurality of electrodes 162 surrounding the second deflection electrode group.

As shown in FIG. 2, a first deflection electrode group 203 corresponds to the first sensing electrode group 201 and is comprised of a plurality of electrodes 162 surrounding the first sensing electrode group 201, where the electrodes 162 are indicated by D11. A first deflection electrode group 213 corresponds to the second sensing electrode group 211 and is comprised of a plurality of electrodes 162 surrounding the second sensing electrode group 211, where the electrodes 162 are indicated by D12. A second deflection electrode group 205 corresponds to the first deflection electrode group 203 and is comprised of a plurality of electrodes 162 surrounding the first deflection electrode group 203, where the electrodes 162 are indicated by D21. A second deflection electrode group 215 corresponds to the first deflection electrode group 213 and is comprised of a plurality of electrodes 162 surrounding the first deflection electrode group 213, where the electrodes 162 are indicated by D22.

A third deflection electrode group 217 corresponds to the second deflection electrode group 215 and is comprised of a plurality of electrodes 162 surrounding the second deflection electrode group 215, where the electrodes 162 are indicated by D32.

The selection switches are divided into a plurality of selection switch groups SW. Each selection switch group corresponds to at least one electrode 162. Each of the longitudinal traces 190 and latitudinal traces 191 is electrically connected to at least one selection switch group SW.

Figure 3A:
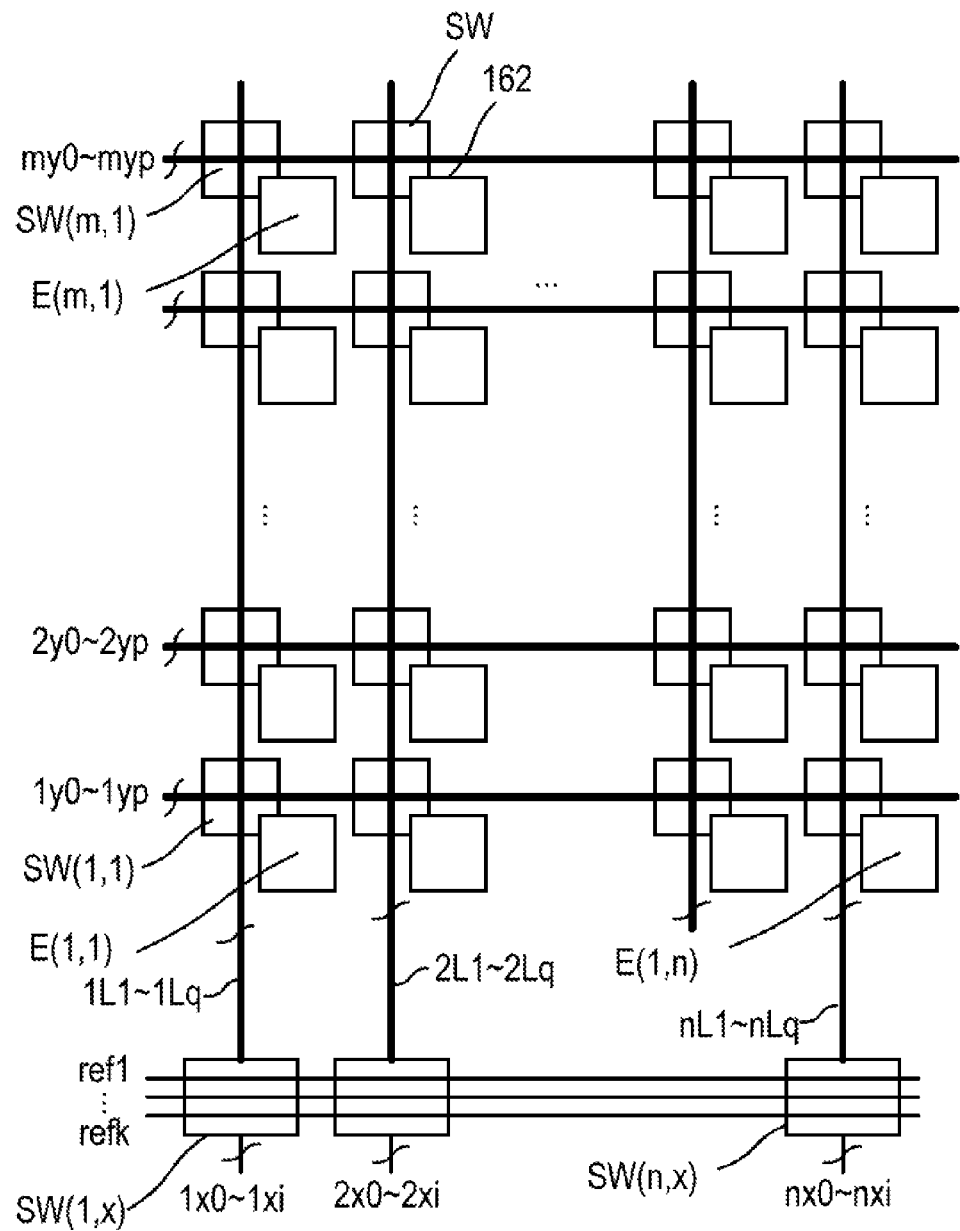
FIG. 3(A) schematically illustrates electrodes and selection switch groups according to a preferred embodiment of the invention.
Figure 3B:
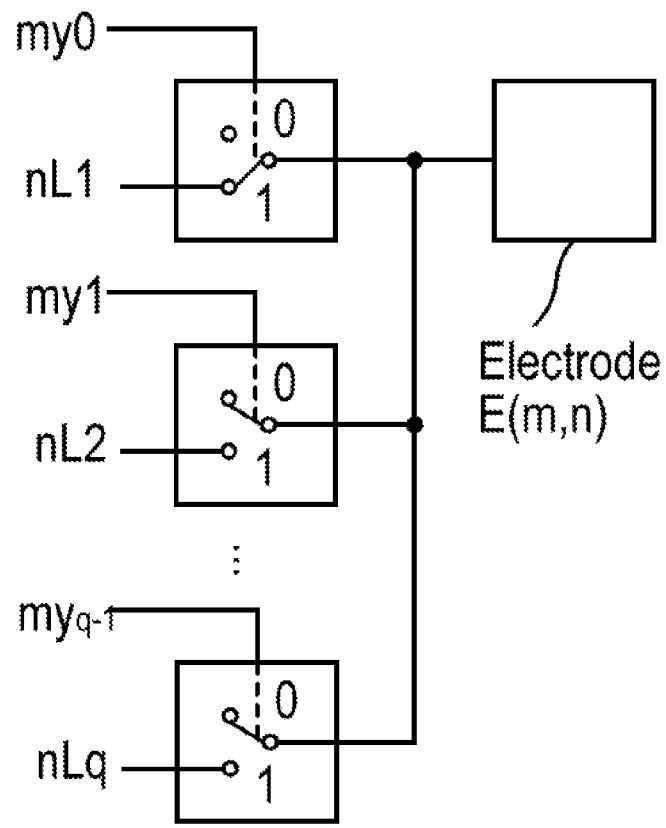
FIG. 3(B) schematically illustrates a switch configuration of a selection switch group SW(m,n) of FIG. 3(A) according to the invention.
Figure 3C:
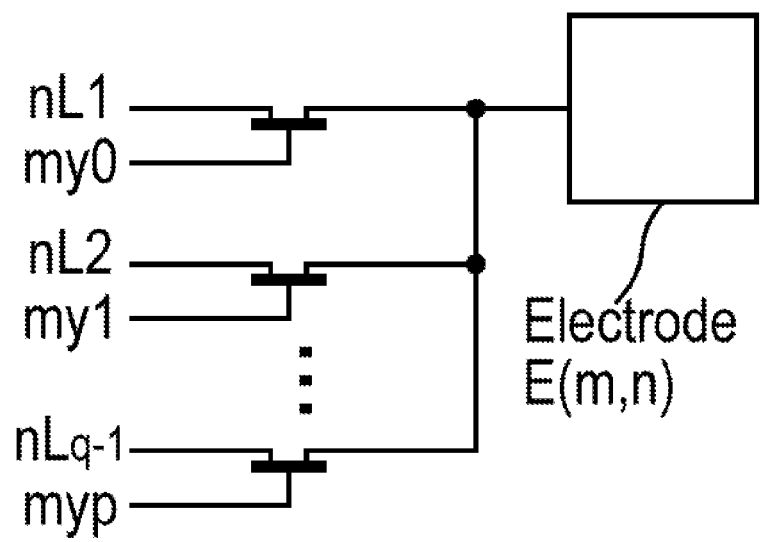
FIG. 3(C) is a circuit diagram of a selection switch group SW(m,n) of FIG. 3(A) according to the invention.

FIG. 3(A) schematically illustrates electrodes and selection switch groups according to a preferred embodiment of the invention. In FIG. 3(A), which is characterized in small amount of traces and easy control, there are a plurality of electrodes 162 (indicated by E(m,n)) arranged in a matrix form, selection switch groups SW(m,n) corresponding to the electrodes in pairs and also arranged in a matrix form, and a plurality of selection switch groups arranged outside of the matrix. Each selection switch group SW(n,x) corresponds to a column of sensing electrodes 162 through a set of longitudinal lines nL1-nLq. Each selection switch group SW(m, n), SW(n,x) is comprised of a plurality of switches. As shown in FIG. 3(A), when viewing from top to bottom, each selection switch group SW(m,n) corresponds to one electrode 162, and said selection switch group and electrode are at least partially overlapped with each other. For showing the existence of the selection switch groups SW(m,n) and electrodes 162, the selection switch groups SW(m,n) and electrodes 162 are drawn to have a slight displacement. As shown in FIGS. 3(A), 3(B), and 3(C), the latitudinal lines 1y0-1yp are provided to connect and control the selection switch groups SW(1,1) to SW(1,n). For example, the latitudinal line ly0 controls the selection switch group SW(1,1) to decide which one of the longitudinal lines 1L1-1Lq to be connected with the electrode E(1,1). In addition, the control signals 1x0-1xi are provided to control the selection switch group SW(1,x) in order to connect the longitudinal lines 1L1-1Lq to one of the sensing signal and deflection signals ref1, ..., refk. Similar process applies to the others, and thus a detailed description therefor is deemed unnecessary.

Figure 4:
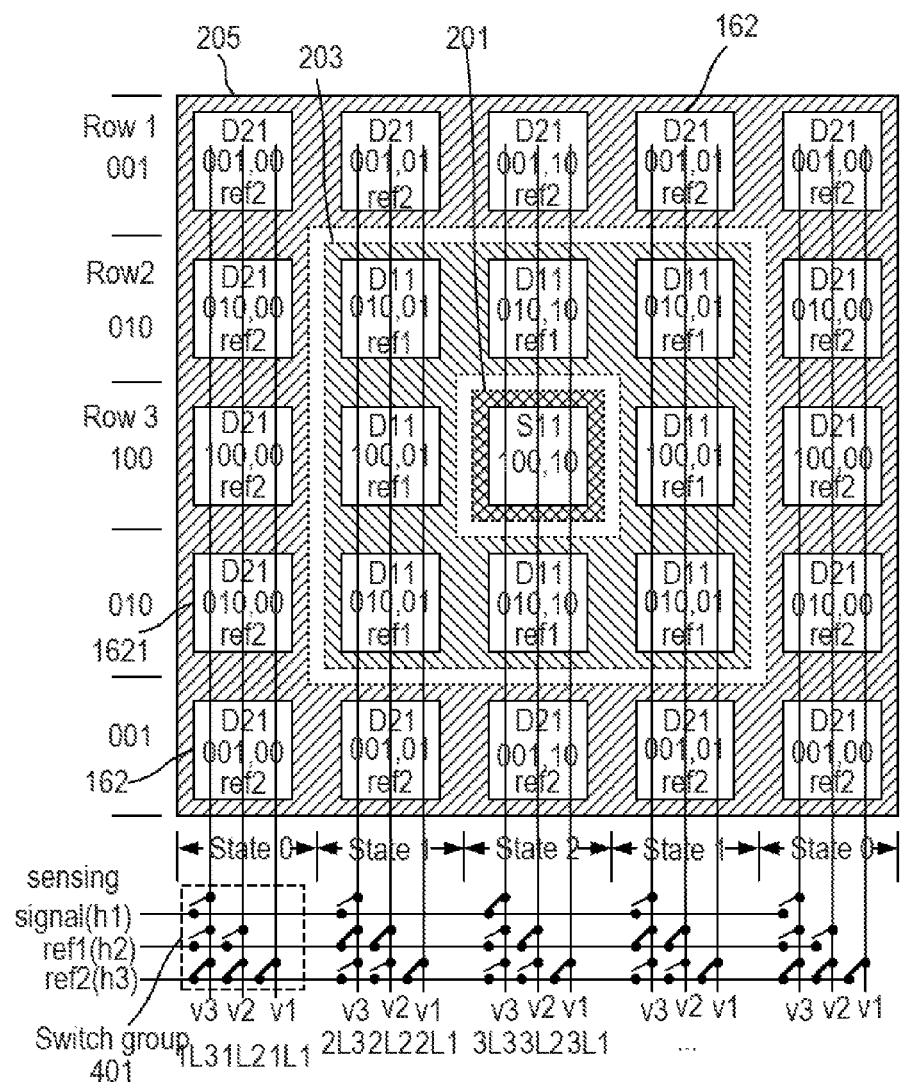
FIG. 4 schematically illustrates the operation of electrodes and selection switch groups according to the invention.

FIG. 4 schematically illustrates the operation of electrodes and selection switch groups according to the invention. As shown in FIG. 4 and FIGS. 3(A) and 3(B), the latitudinal lines 1y0-1yp, 2y0-2yp, ..., my0-myp control their respective electrodes to be electrically connected with which one of the longitudinal lines. The electrodes 162 of the first row have a latitudinal signal of "001" to indicate that the electrodes 162 of the first row are electrically connected with their respective first longitudinal lines v1 (1L1, 2L1, ... ). The electrodes 162 of the second row have a latitudinal signal of "010" to indicate that electrodes 162 of the second row are electrically connected with their respective second longitudinal lines v2 (1L2, 2L2, ... ). The electrodes 162 of the third row have a latitudinal signal of "100" to indicate that the electrodes 162 of the third row are electrically connected with their respective third longitudinal lines v3(1L3, 2L3, ... ). Namely, the latitudinal lines 1y0-1yp use "001" to indicate that the electrode 162 of the first column in this row is electrically connected with its first longitudinal line 1L1, the electrode 162 of the second column is electrically connected with its first longitudinal line 2L1, and so on. The latitudinal lines 1y0-1yp use "010" to indicate that the electrode 162 of the first column in this row is electrically connected with its second longitudinal line 1L2, the electrode 162 of the second column is electrically connected with its second longitudinal line 2L2, and so on. The latitudinal lines 1y0-1yp use "100" to indicate that the electrode 162 of the first column in this row is electrically connected with its third longitudinal line 1L3, the electrode 162 of the second column is electrically connected with its third longitudinal line 2L3, and so on.

The control signals $1x0$-$1xi$, $2x0$-$2xi$, ..., $nx0$-$nxi$ control the longitudinal lines 1L1-1Lq, 2L1-2Lq, ..., nL1-nLq to be connected to one of the sensing signal and deflection signals ref1, ..., refk. As shown in FIGS. 3(A) and 4, the control signals $1x0$-$1xi$, $2x0$-$2xi$, ..., $nx0$-$nxi$ are represented by two bits capable of forming four states. In the embodiment of FIG. 4, for the longitudinal lines 1L1-1Lq, 2L1-2Lq, ..., nL1-nLq, each set has three longitudinal lines $v1$-$v3$ and three signal lines $h1$-$h3$ only, which only needs three states, i.e., state 0, state 1, state 2. The signal lines h1, h2, and h3 correspond to the sensing signal, the first deflection signal ref1, and the second deflection signal ref2, respectively. Three longitudinal lines v1, v2, v3 of the first column correspond to 1L1, 1L2, 1L3, respectively; three longitudinal lines v1, v2, v3 of the second column correspond to 2L1, 2L2, 2L3, respectively, and so on. Thus, three longitudinal lines v1, v2, v3 of the n-th column correspond to nL1, nL2, nL3, respectively.

The state 0, state 1, state 2 respectively control the switch group 401, and further control connections of the longitudinal lines and signal lines. At state 0 (00b), the longitudinal lines v1, v2, v3 are connected to the signal line h3. At state 1 (01b), the longitudinal line v1 is connected to the signal line h3, and the longitudinal lines v2 and v3 are connected to the signal line h2. At state 2 (10b), the longitudinal line v1 is connected to the signal line h3, the longitudinal line v2 is connected to the signal line h2, and the longitudinal line v3 is connected to the signal line h1.

As cited above, a first sensing electrode group 201 consisting of the electrode labeled by S11 is connected to the sensing signal. A first deflection electrode group 203 consisting of the electrodes labeled by D11 is connected to the first deflection signal ref1. A second deflection electrode group 205 consisting of the electrodes labeled by D21 is connected to the second deflection signal ref2. The deflection signals ref1, ref2 have a phase as same as or opposite to that of the sensing signal for the sensing electrode group, or have another specific voltage signal that can be zero, positive, negative or AC voltage.

A control code "010,00" is shown on the electrode 1621, where the first three bits "010" indicate that the electrode is electrically connected with the second longitudinal line v2. In case of "001", it indicates that the electrode is electrically connected with the first longitudinal line v1. In case of "100", it indicates that the electrode is electrically connected with the third longitudinal line v2. Namely, the first three bits shown in FIG. 4 is obtained by one-hot encoding. For the last two bits "00" of the control code, it indicates state 0. If the last two bits of the control code is "01", it indicates state 1. If the last two bits of the control code is "10", it indicates state 2.

Figure 5:
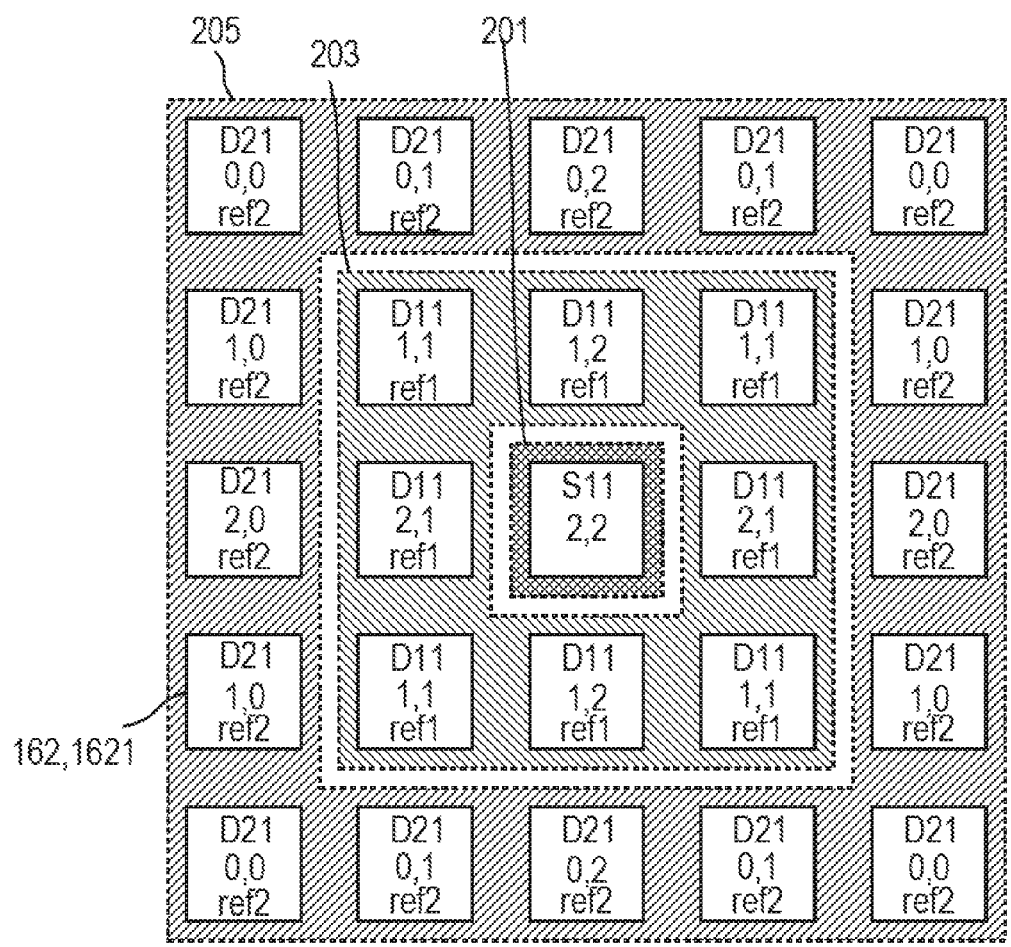
FIG. 5 schematically illustrates a control code for the electrodes according to the invention.

FIG. 5 is a schematic diagram of the control code for electrodes according to the invention. By taking the electrode 1621 as an example, it has the control code "010,00" in FIG. 4 and "1,0" in FIG. 5. In comparison, it is known that the first number (1) in FIG. 5 is decimal, which corresponds to the first three bits "010" in FIG. 4, and the second number (0) in FIG. 5 is decimal, which corresponds to the last two bits "00" in FIG. 4. Namely, when the first number is "0" in FIG. 5, it corresponds to the first three bits "000" in FIG. 4; when the first code is "1", it corresponds to the first three bits "010" in FIG. 4. When the second code is "2", it corresponds to the first three bits "100" in FIG. 4; when the second number is "0" in FIG. 5, it corresponds to the last two bits "00" in FIG. 4; when the second code is "1", it corresponds to the last two bits "01" in FIG. 4; if the second code is "2", it corresponds to the last two bits "10".

Figure 6:
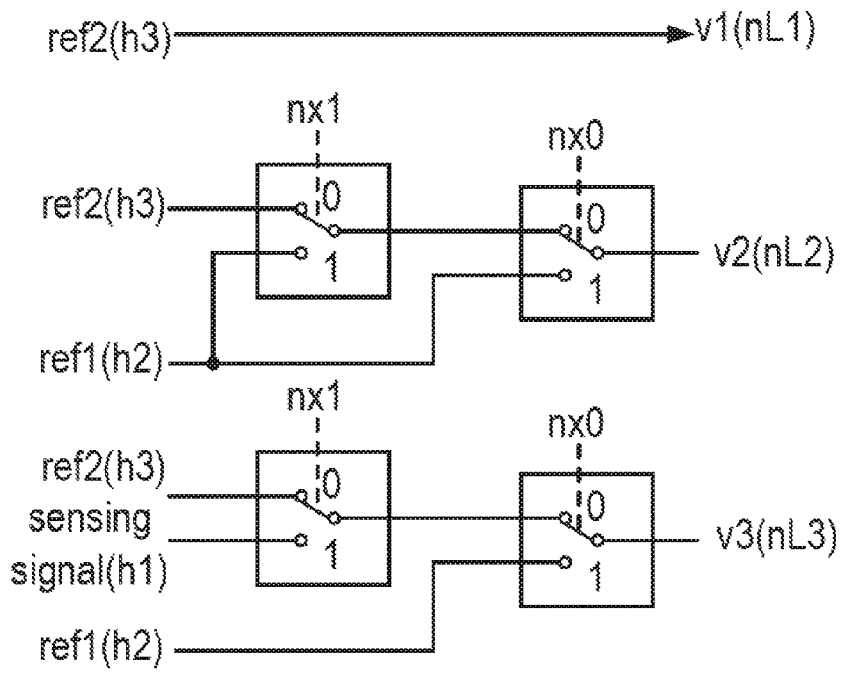
FIG. 6 schematically illustrates a switch configuration of a selection switch group SW(n,x) of FIG. 3(A) according to the invention.

FIG. 6 schematically illustrates a switch configuration of the selection switch group SW(n,x) according to the invention. In FIG. 6, the selection switch group SW(n,x) is comprised of a plurality of selection switches and controlled by the control signals $nx0$-$nxi$. As shown in FIG. 6 where i=1, it indicates that the control signals nx0 and nx1 are used for control. When being in state 0, we have nx1=0 and nx0=0, so that the longitudinal lines v1, v2, v3 are respectively connected to the signal line h3. When being in state 1, we have nx1=0 and nx0=1, so that the longitudinal lines v2, v3 are respectively connected to the signal line h2, and the longitudinal line v1 is connected to the signal line h3. When being in state 2, we have nx1=1 and nx0=0, so that the longitudinal line v1 is connected to the signal line h3, the longitudinal line v2 is connected to the signal line h2, and the longitudinal line v3 is connected to the signal line h1.

Figure 7:
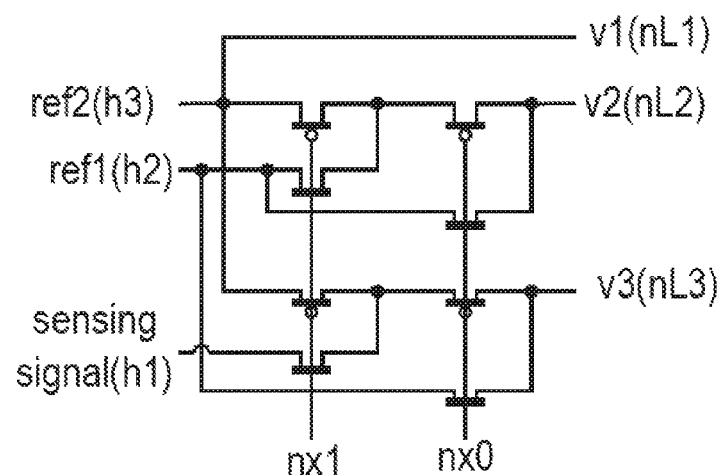
FIG. 7 is a circuit diagram of a selection switch group SW(n,x) of FIG. 3(A) according to the invention.

FIG. 7 is a circuit diagram of the selection switch group SW(n,x) according to the invention, in which the switch group configuration of FIG. 6 is implemented by using transistors as the switches. The switches of the selection switch group SW(n,x) can be field effect transistors (FETs) or thin film transistors (TFTs) implemented on the substrate 110, or implemented in an IC outside of the substrate 110.

Figure 8:
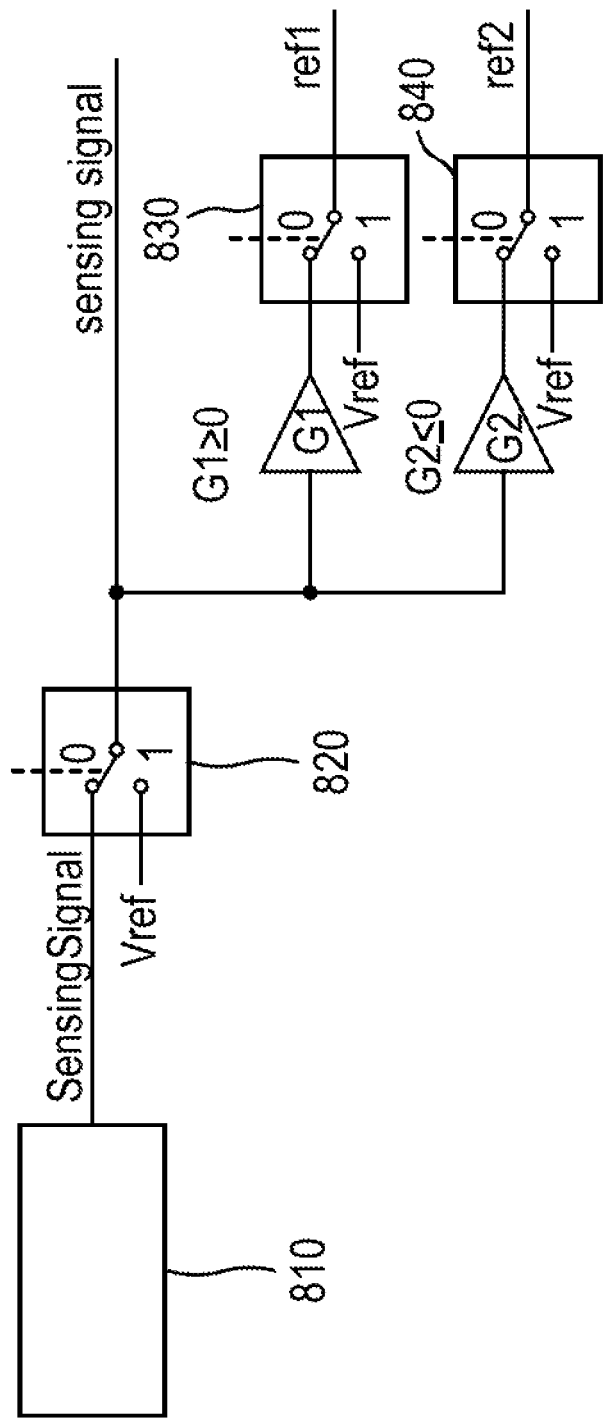
FIG. 8 is a schematic view of a detection signal generation circuit according to the invention.

FIG. 8 is a schematic view of a detection signal generation circuit according to the invention, which is used to generate the sensing signal, the first deflection signal ref1, and the second deflection signal ref2. A sensing/driving circuit 810 of the detection signal generation circuit generates a signal (Sensing_Signal), which is a periodic or non-periodic AC signal. The signal passes through a selector 820 to generate the sensing signal. The circuit 810 can be implemented on the substrate 110 or in an independent IC outside of the substrate 110. The sensing signal is electrically connected to the sensing electrode group 201.

The sensing signal is processed by at least one signal amplifier G1 with a positive gain to generate a sense enhanced deflection signal with the same phase as the sensing signal. The sense enhanced deflection signal passes through a selector 830 to generate the first deflection signal ref1. The first deflection signal ref1 is electrically connected to the first deflection electrode group 203. Thus, the amplifier G1 has an input terminal electrically connected to the sensing electrode group 201 and an output terminal electrically connected to the first deflection electrode group 203. The amplifier G1 is implemented on the substrate 110 or in an IC (not shown) outside of the substrate 110, and its gain is constant or programmable.

The sensing signal is processed by at least one signal amplifier G2 with a gain not greater than zero to generate a sense suppressed deflection signal with a phase opposite to the sensing signal. The sense suppressed deflection signal passes through a selector 840 to generate the second deflection signal ref2. The second deflection signal ref2 is electrically coupled to the second deflection electrode group 205. Thus, the signal amplifier G2 has an input terminal electrically connected to the sensing electrode group 201 and an output terminal electrically connected to the second deflection electrode group 205. The signal amplifier G2 is implemented on the substrate 110 or in an IC (not shown) outside of the substrate 110, and its gain can be constant or programmable.

In other embodiments, the sensing signal, the first deflection signal ref1, the second deflection signal ref2 can be originated from a specific voltage signal Vref through the selectors 820, 830, 840. The specific voltage signal Vref can be a zero, positive, negative, or AC voltage signal.

Figure 9:
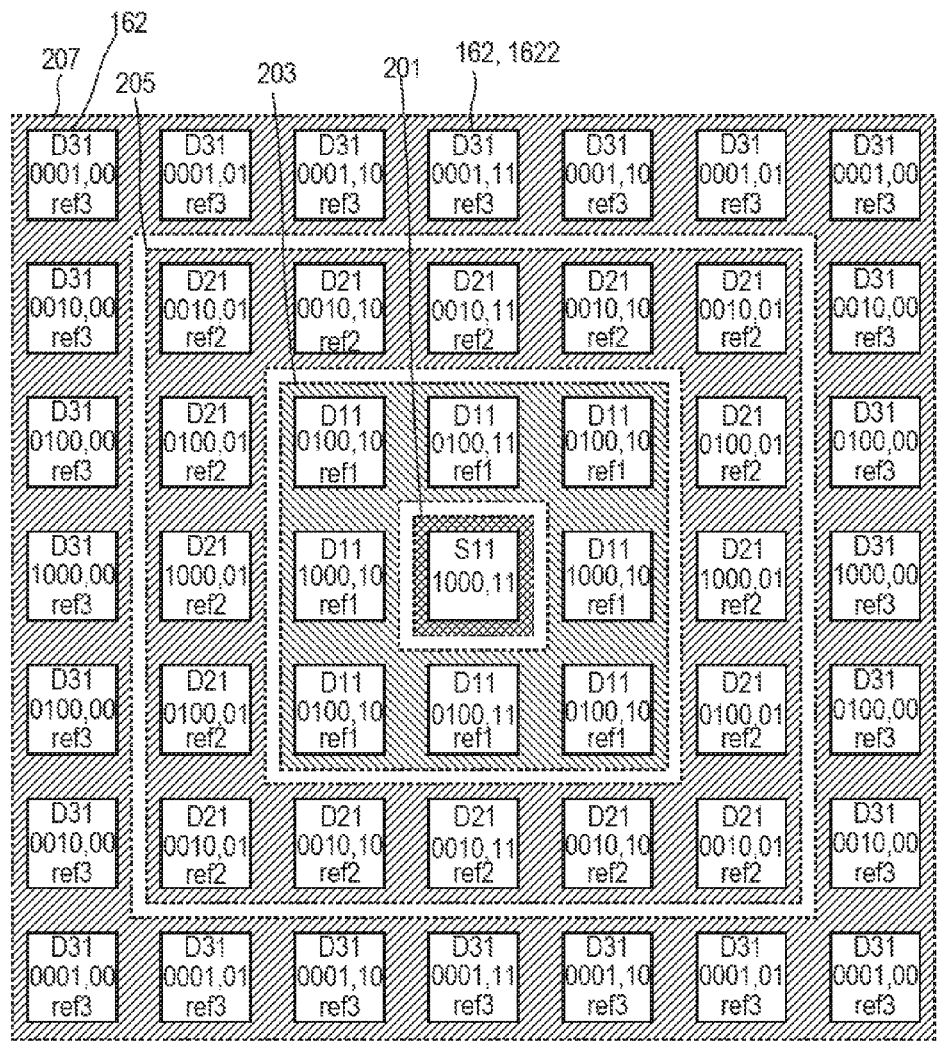
FIG. 9 is another schematic diagram of an electrode layer according to the invention.

FIG. 9 is another schematic diagram of the electrode layer 160 according to the invention. The electrode layer 160 can be divided into a sensing electrode group 201, a first deflection electrode group 203, a second deflection electrode group 205, and a third deflection electrode group 207. The sensing electrode group 201 is electrically connected to a sensing signal. The first deflection electrode group 203 is electrically connected to a first deflection signal ref1. The second deflection electrode group 205 is electrically connected to a second deflection signal ref2. The third deflection electrode group 207 is electrically connected to a third deflection signal ref3.

A control code is shown on the electrodes 162 of the electrode layer 160. For example, there is a control code "0001,11" on the electrode 1622, where the first four bits of the control code are "0001" to indicate that the electrode 1622 is electrically connected with the first longitudinal line v1(nL1). In case of "0010", it indicates that the electrode 1622 is electrically connected with the second longitudinal line v2(nL2). In case of "0100", it indicates that the electrode is electrically connected with the third longitudinal line v3(nL3). In case of "1000", it indicates that the electrode 1622 is electrically connected with the fourth longitudinal line v4 (nL4).

For the last two bits "00" the control code representing state 0 (00b), it indicates that the longitudinal lines v1(nL1), v2(nL2), v3(nL3), v4(nL4) are respectively connected to the signal line h4(ref3).

For the last two bits "01" representing state 1 (01b), it indicates that the longitudinal line v1(nL1) is connected to the signal line h4(ref3), and the longitudinal line v2(nL2), v3(nL3), v4(nL4) are respectively connected to the signal line h3(ref2).

For the last two bits "10" representing state 2 (10b), it indicates that the longitudinal line v1(nL1) is connected to the signal line h4(ref3), the longitudinal line v2(nL2) is connected to the signal line h3(ref2), and the longitudinal lines v3(nL3), v4(nL4) are respectively connected to the signal line h2(ref1). For the last two bits "11" representing state 3 (11b), it indicates that the longitudinal line v1(nL1) is connected to the signal line h4(ref3), the longitudinal line v2(nL2) is connected to the signal line h3(ref2), the longitudinal line v3(nL3) is connected to the signal line h2(ref1), and the longitudinal line v4(nL4) is connected to the signal line h1 (sensing signal).

Figure 10:
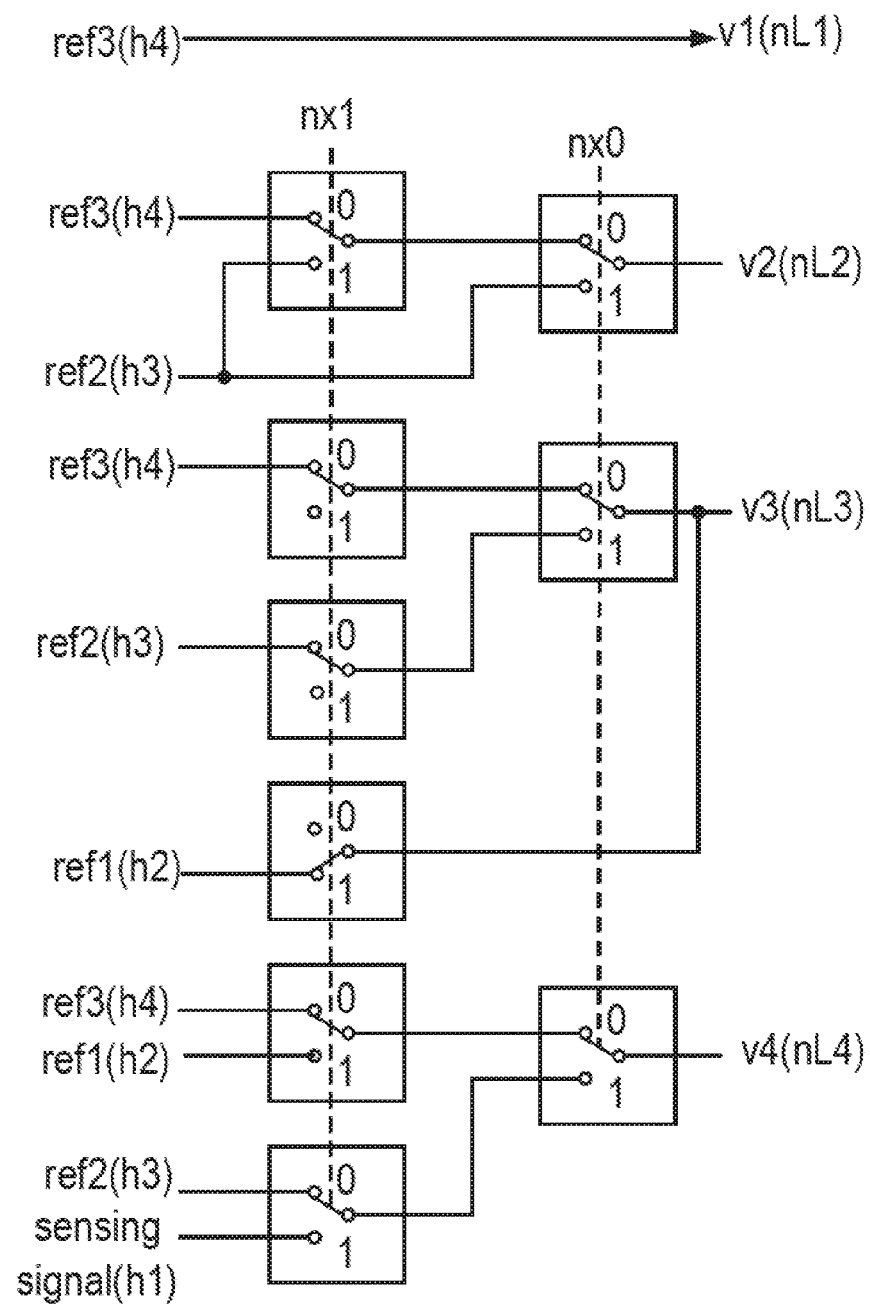
FIG. 10 schematically illustrates another switch configuration of a selection switch group SW(n,x) of FIG. 3(A) according to the invention.

FIG. 10 schematically illustrates another switch configuration of a selection switch group SW(n,x) according to the invention. The selection switch group SW(n,x) is controlled by the control signals nx0-nxi. As shown in FIG. 10 where i=1, it indicates that the control signals nx0 and nx1 are used for control. When being in state 0, we have nx1=0 and nx0=0, so that the longitudinal lines v1(nL1), v2(nL2), v3(nL3) are respectively connected to the signal line h4(ref3). When being in state 1, we have nx1=0 and nx0=1, so that the longitudinal line v1(nL1) is connected to the signal line h4(ref3), and the longitudinal lines v2(nL2), v3(nL3), v4 (nL4) are respectively connected to the signal line h3(ref2). When being in state 2, we have nx1=1 and nx0=0, so that the longitudinal line v1(nL1) is connected to the signal line h4(ref3), the longitudinal line v2(nL2) is connected to the signal line h3(ref2), and the longitudinal lines v3(nL3), v4(nL4) are respectively connected to the signal line h2(ref1). When being in state 3, we have nx1=1 and nx0=1, so that the longitudinal line v1(nL1) is connected to the signal line h4(ref3), the longitudinal line v2(nL2) is connected to the signal line h3(ref2), the longitudinal line v3(nL3) is connected to the signal line h2(ref1), and the longitudinal line v4(nL4) is connected to the signal line h1 (sensing signal).

Figure 11:
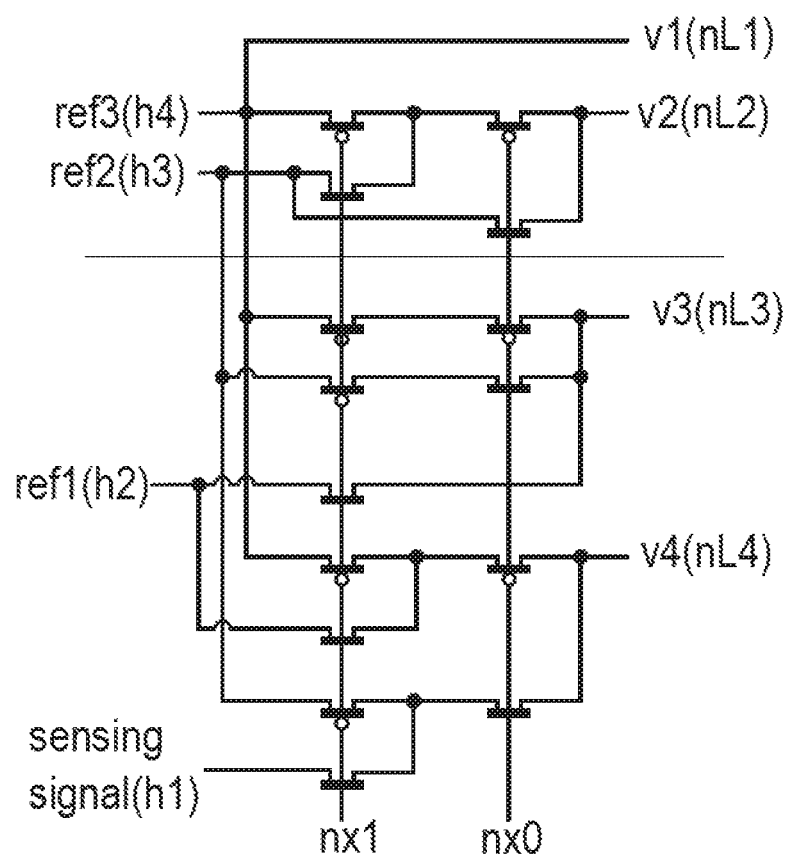
FIG. 11 is a circuit diagram of the selection switch group of FIG. 10 according to the invention.

FIG. 11 is a circuit diagram of the selection switch group SW(n,x) of FIG. 10 according to the invention. In FIG. 11, the group SW(n,x) of FIG. 10 is implemented with a plurality of transistor switches. The selection switch group SW(n,x) can be implemented with a plurality of FETs or TFTs on the substrate 110. The switches can also be implemented in an IC outside of the substrate 110.

Figure 12:
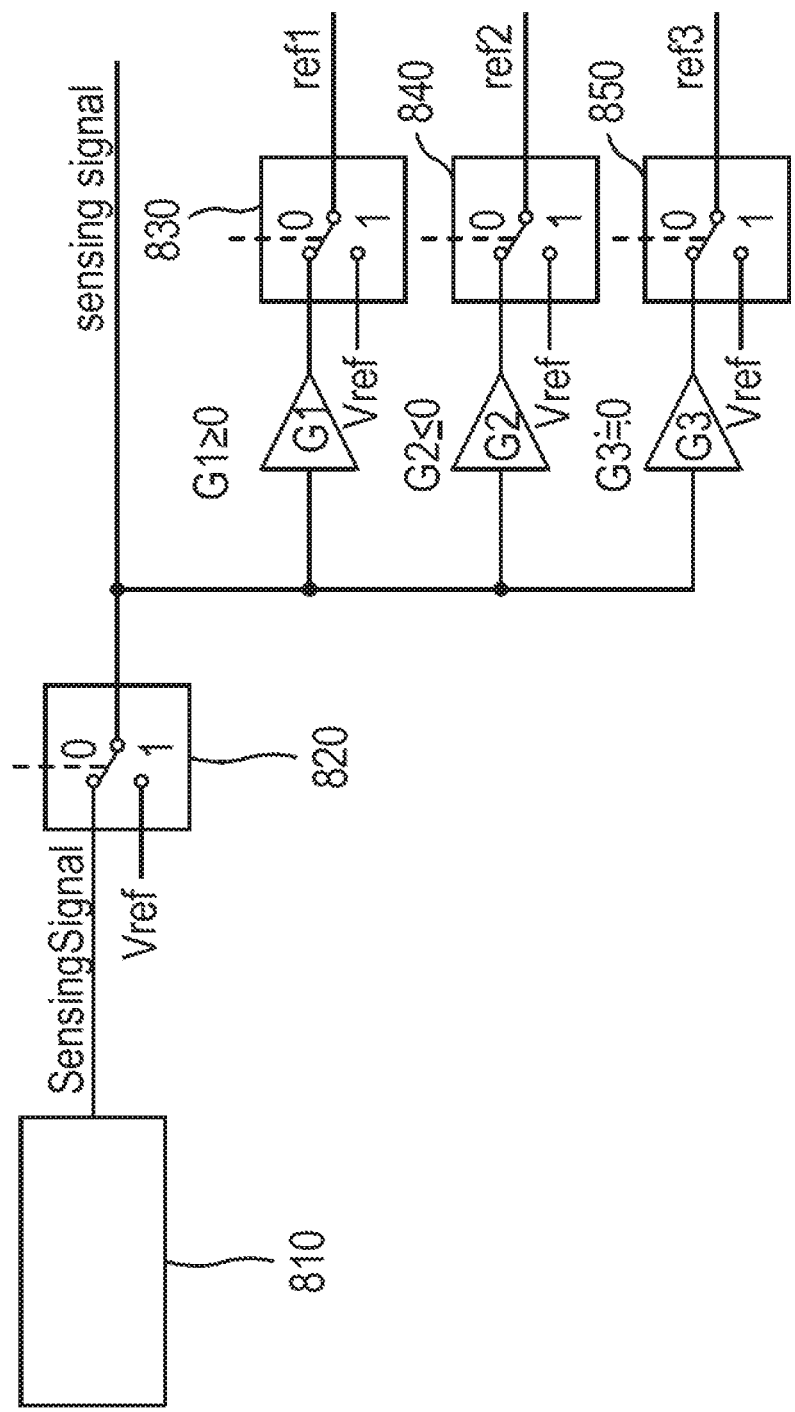
FIG. 12 is another schematic view of a detection signal generation circuit according to the invention.

FIG. 12 is another schematic view of the detection signal generation circuit according to the invention, which generates the sensing signal, the first deflection signal ref1, the second deflection signal ref2, and the third deflection signal ref3. In comparison with FIG. 8, the difference in FIG. 12 is to add at least one signal amplifier G3 with a gain close to zero and a selector 850. The sensing signal is processed by the amplifier G3 and then passes through the selector 850 to generate the third deflection signal ref3. The third deflection signal ref3 is electrically coupled to the third deflection electrode group 207. Thus, the amplifier G3 has an input terminal electrically connected to the sensing electrode group 201 and an output terminal electrically connected to the third deflection electrode group 207. The amplifier G3 is implemented on the substrate 110 or in an external IC (not shown), and its gain is constant or programmable.

Figure 13:
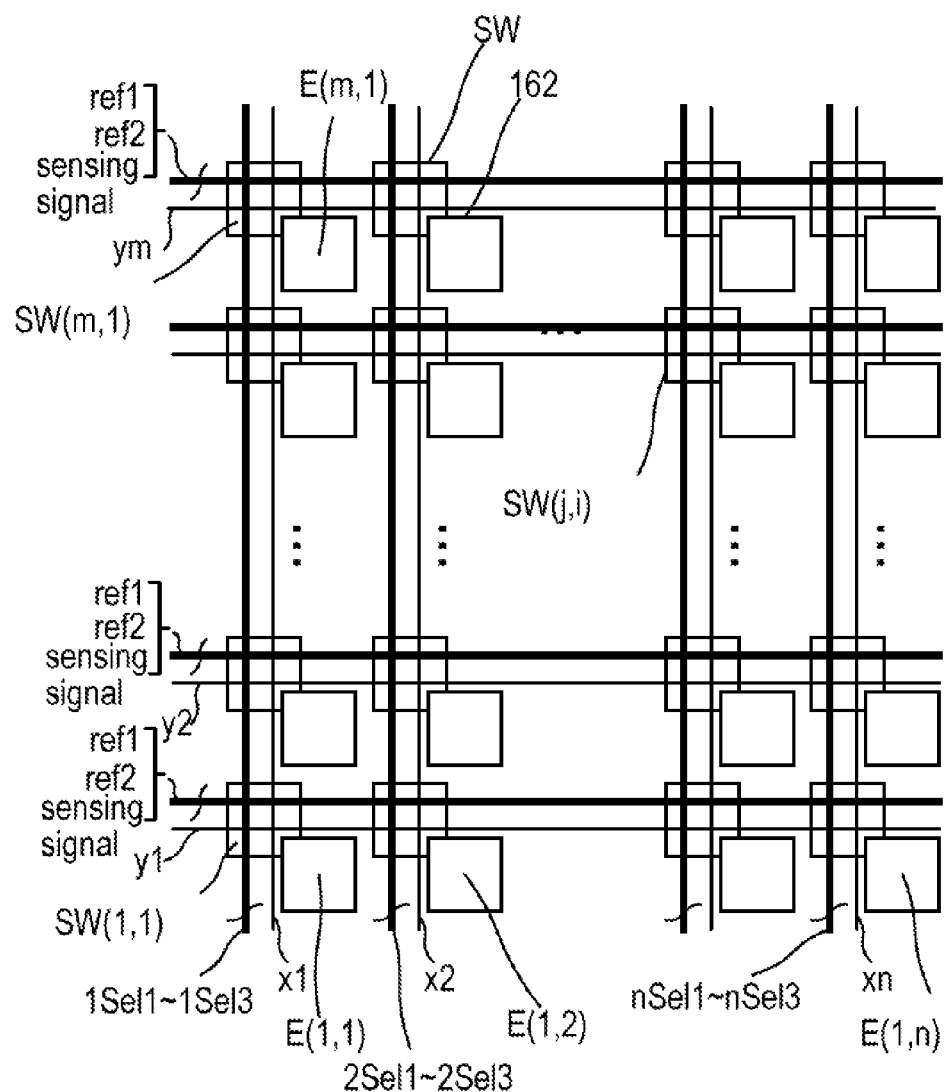
FIG. 13 schematically illustrates electrodes and selection switch groups according to another preferred embodiment of the invention.

FIG. 13 schematically illustrates electrodes and selection switch groups according to another preferred embodiment of the invention. As shown in FIG. 13, when viewing from top to bottom, the selection switch group SW(j,i) and the corresponding electrode 162 are overlapped with each other. For showing the existence of the selection switch groups SW(m,n) and electrodes 162, the selection switch groups SW(m,n) and electrodes 162 are drawn to have a slight displacement. The sensing signal and the deflection signals ref1, ref2 are connected by the traces to the selection switch group SW(j,i) corresponding to each electrode 162. In this embodiment, as to be described in detail hereinafter, control signals xi and yj are both high to select a desired electrode and further to one of control signals iSel1-iSel3 to configure for connecting the selected electrode to the sensing signal or a deflection signal.

Figure 14:
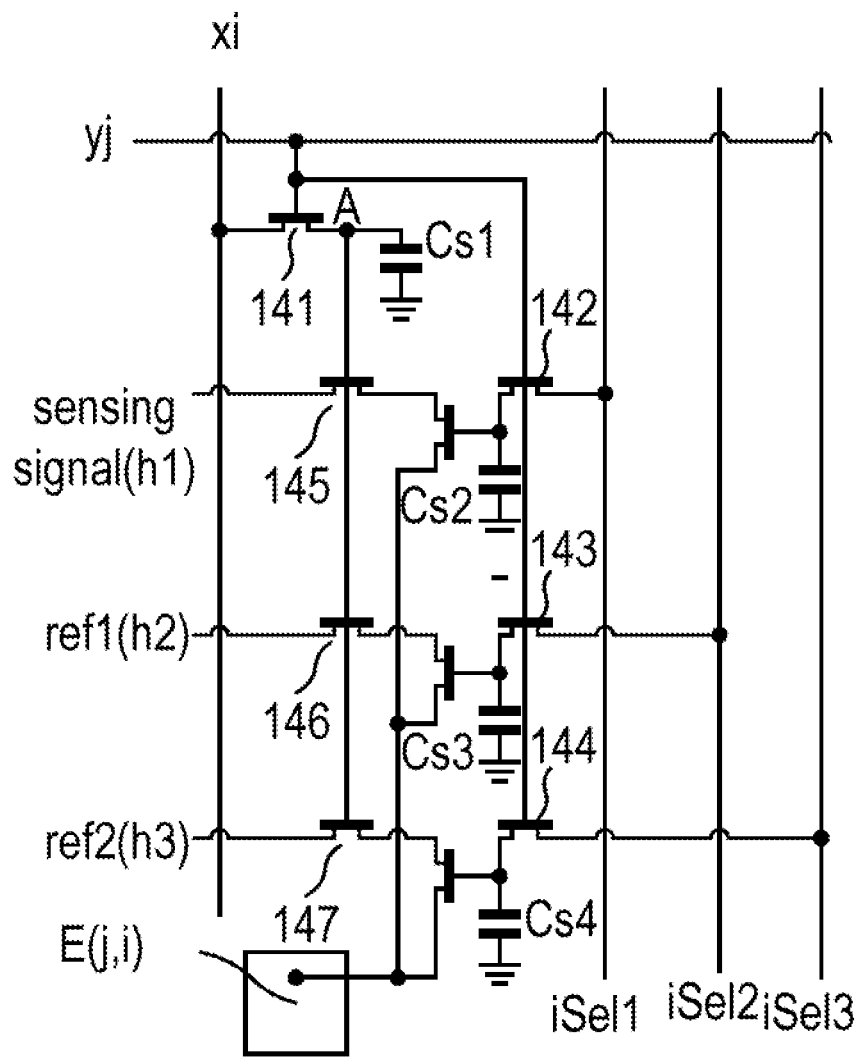
FIG. 14 is a circuit diagram of a selection switch group SW(j,i) of FIG. 13 according to the invention.

FIG. 14 is a circuit diagram of a selection switch group SW(j,i) of FIG. 13 according to the invention. The selection switch group SW(j,i) is implemented with the FETs or TFTs on the substrate 110. When the control signal xi is high (xi=1) and the control signal yj is high (yj=1), the transistors 141-144 are turned on, so that the capacitor Cs1 is high (Cs1=1), and the transistors 145-147 are turned on, so that the capacitor Cs2 has a voltage of iSel1, the capacitor Cs3 has a voltage of iSel2, the capacitor Cs4 has a voltage of iSel3. One of the control signals iSel1, iSel2, iSel3 is equal to a high voltage (=1), and its corresponding sensing signal and deflection signals ref1, ref2 are electrically connected to the electrode E(j,i). For example, when iSel3=1, ref2 is electrically coupled to the electrode E(j,i).

Figure 15:
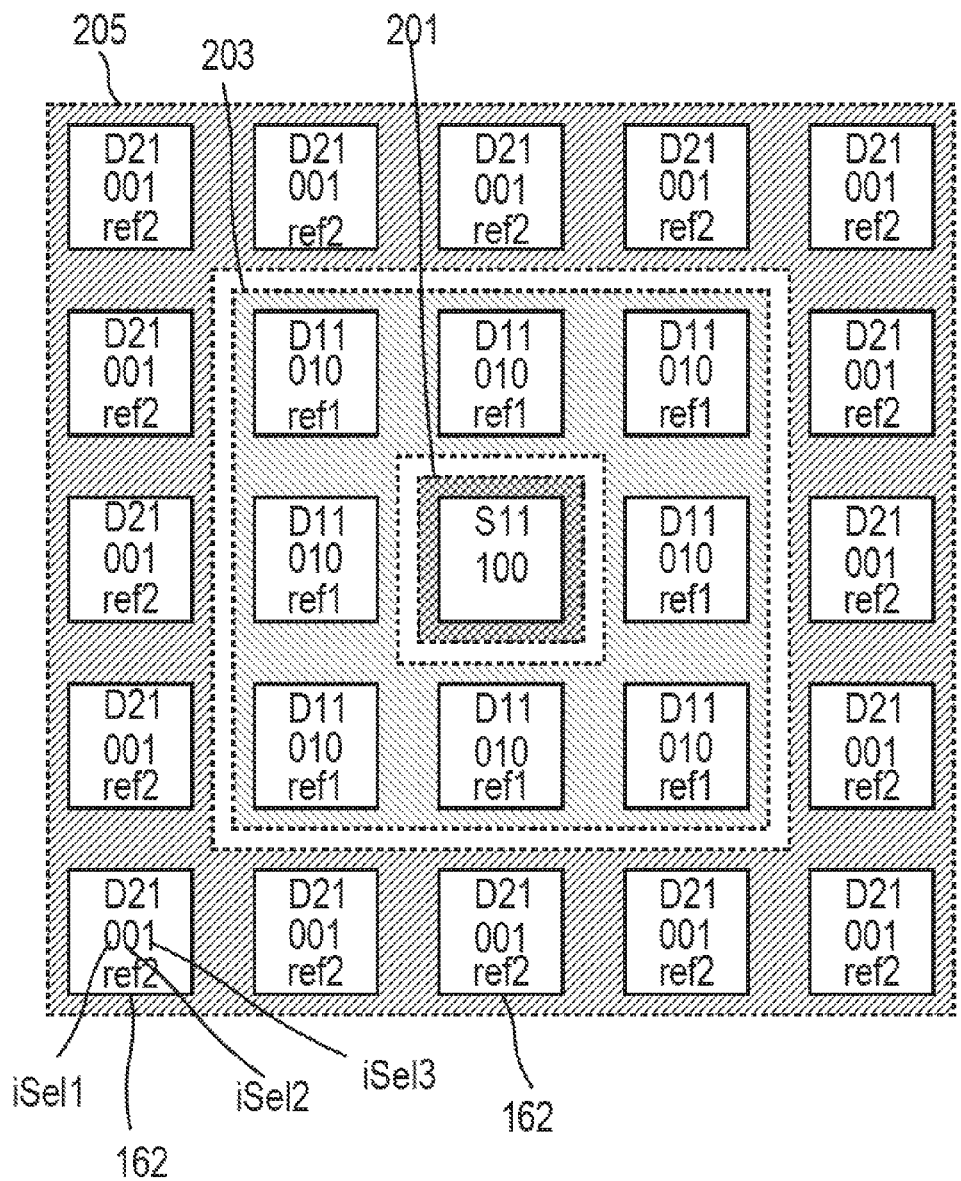
FIG. 15 schematically illustrates another control code for electrodes according to the invention.

FIG. 15 schematically illustrates another control code for electrodes according to the invention. The control code has a first bit for representing the control signal iSel3, a second bit for representing the control signal iSel2, and a third bit for representing the control signal iSel1. Only one of the control signals iSel1, iSel2, iSel3 is at a high voltage, and its corresponding sensing signal and deflection signals ref1, ref2 are electrically coupled to the electrode E(j,i).

Figure 16:
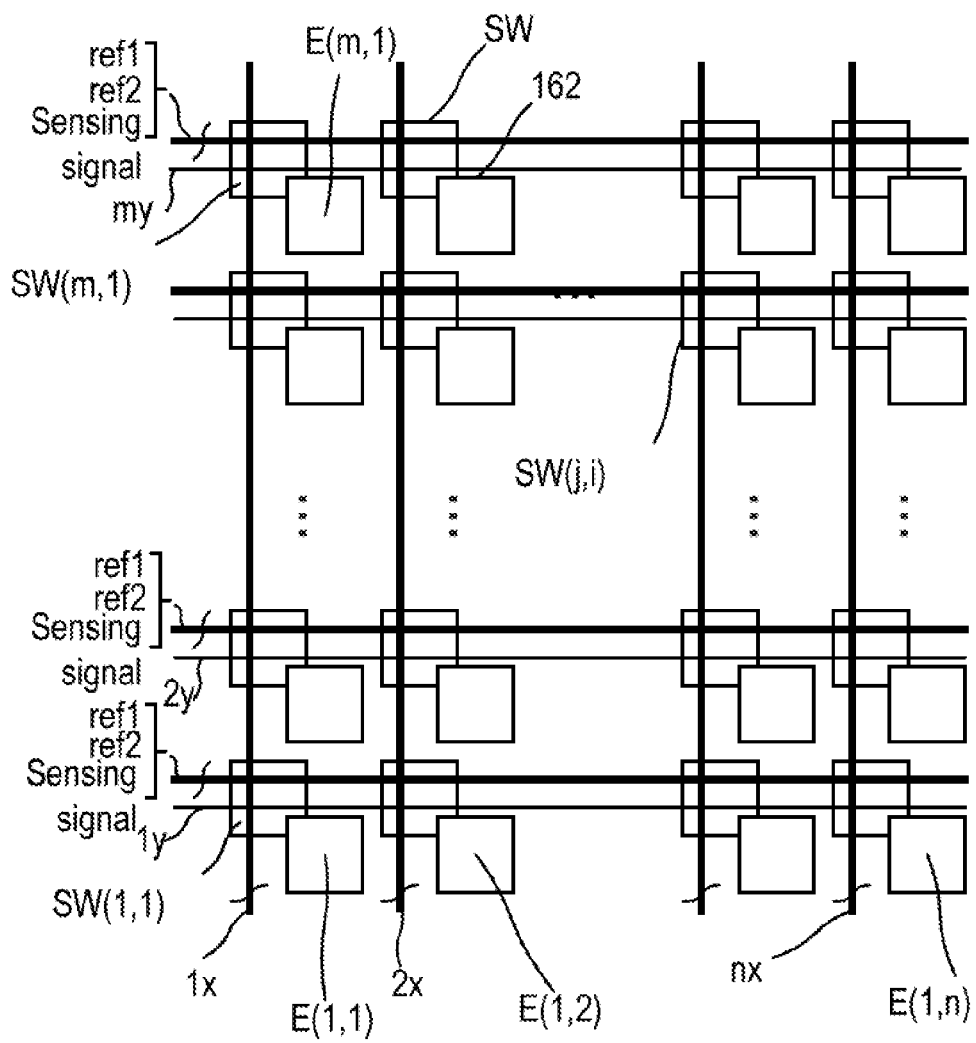
FIG. 16 schematically illustrates electrodes and selection switch groups according to a further preferred embodiment of the invention.

FIG. 16 schematically illustrates electrodes and selection switch groups according to a further preferred embodiment of the invention. In FIG. 3(A), the latitudinal lines 1y0-1yp, 2y0-2yp, . . . , my0-myp control the electrodes 162 of the row to be electrically connected with which one of the longitudinal lines, in which one-hot encoding is adopted. The control signals 1x0-1xi, 2x0-2xi, . . . , nx0-nxi control the longitudinal lines 1L1-1Lq, 2L1-2Lq, . . . , nL1-nLq to be connected to one of the sensing signal, deflection signals ref1, . . . , refk, in which nx0 through nxi bits are used to form states for control. For example, when i=1, two bits nx0 and nx1 are used to form four states, and three states (state 0, state 1, state 2) of which are used for control. In FIG. 16, there are no selection switch groups SW(n,x) as in FIG. 3 and, instead, there are only the selection switch groups SW(j,i) corresponding to the electrodes 162 in pairs. In addition, the sensing signal and deflection signals (ref1, ref2, . . . ) are directly connected through the traces to all the selection switch groups SW(j,i), and the electrodes are divided into the sensing electrode group, the first deflection electrode group, and the second deflection electrode group by using the latitudinal control lines (my) and the longitudinal control lines (nx) to control the switches of each selection switch group. The sensing electrode group, the first deflection electrode group, and the second deflection electrode group are connected to the sensing signal, the first deflection signal ref1, and the second deflection signal ref2, respectively.

Figure 17:
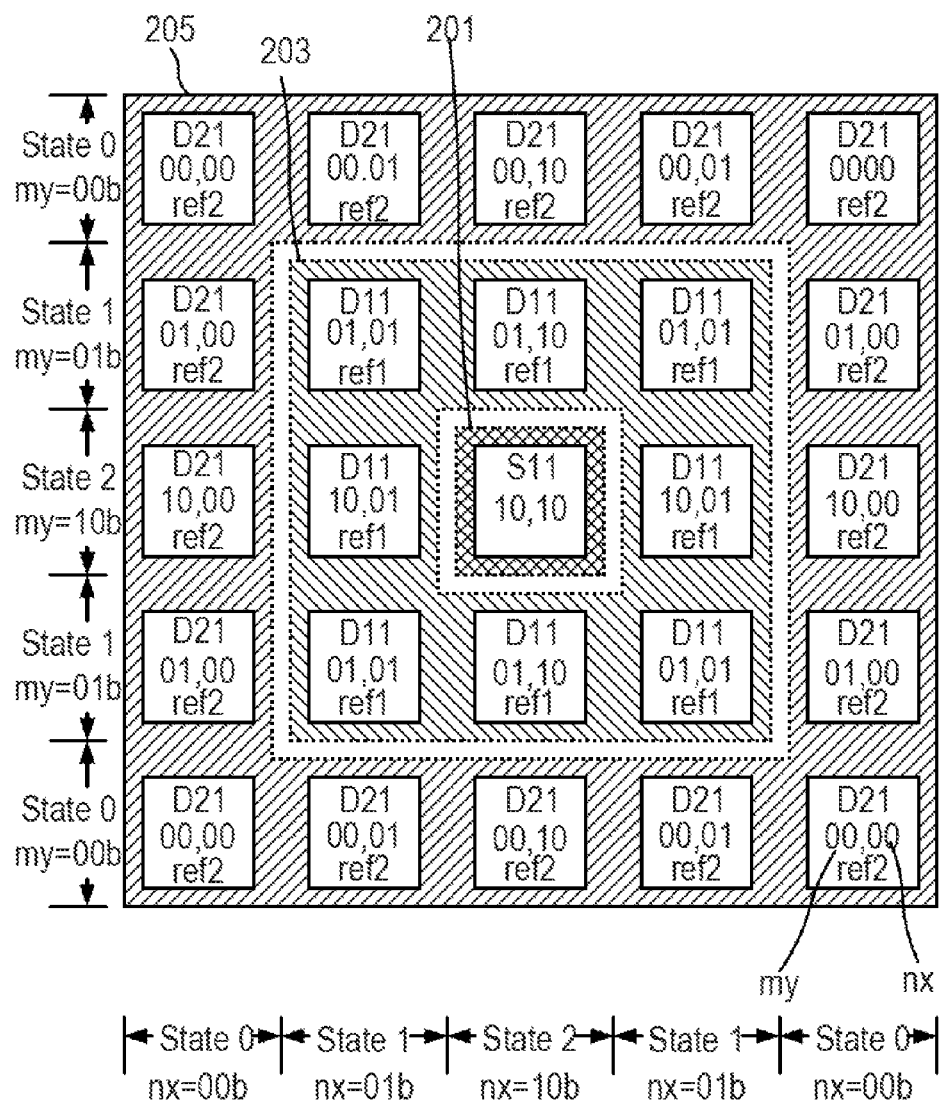
FIG. 17 schematically illustrates a control code for electrodes of FIG. 16 according to the invention.

FIG. 17 schematically illustrates a control code for electrodes of FIG. 16 according to the invention. The first two bits of the control code are used for the latitudinal control line (my) to form state 0, state 1, state 2 while the last two bits are used for the longitudinal control line (nx) to form state 0, state 1, state 2.

Figure 18:
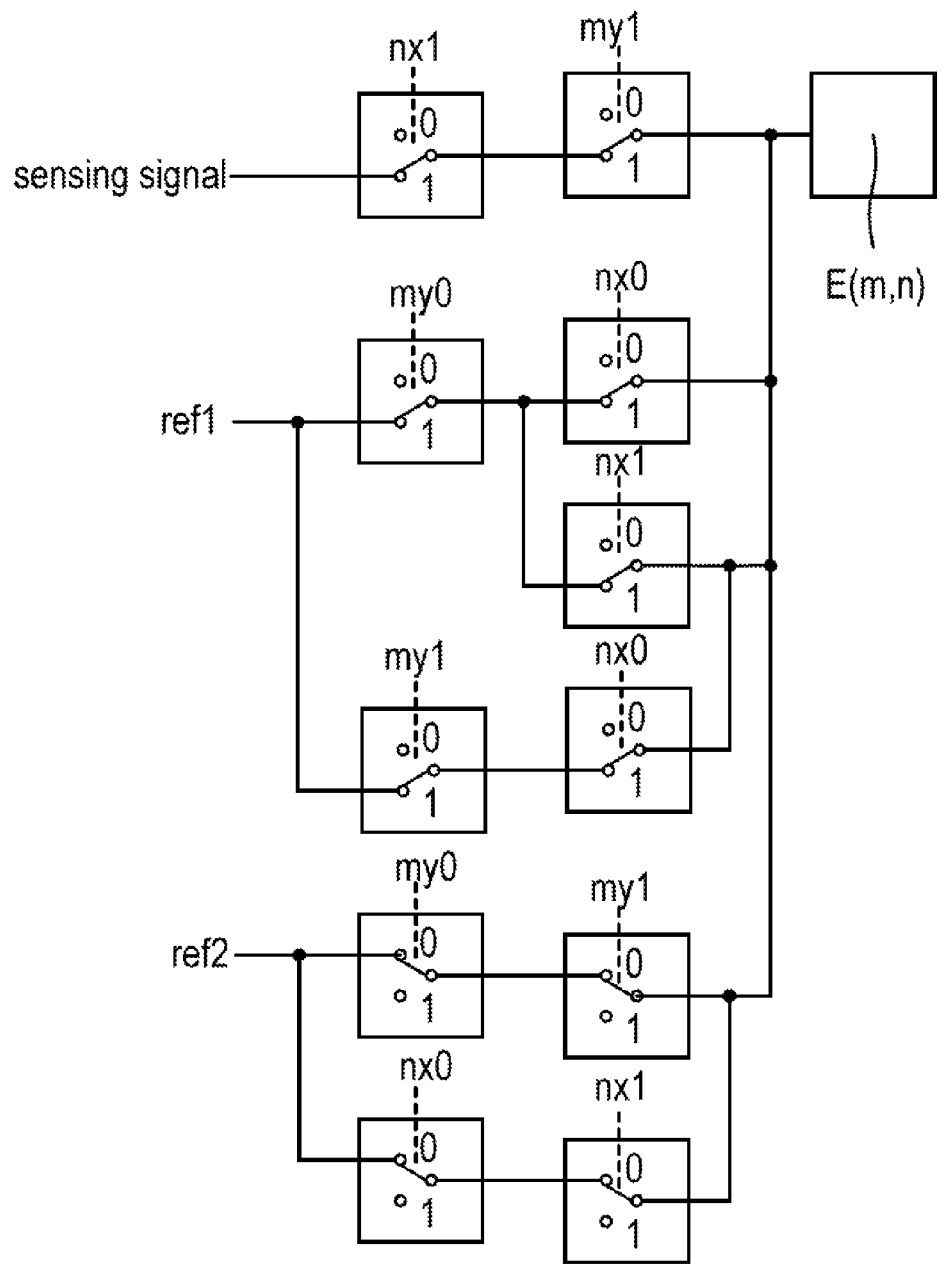
FIG. 18 schematically illustrates a switch configuration of a selection switch group SW(m,n) of FIG. 16 according to the invention.
Figure 19:
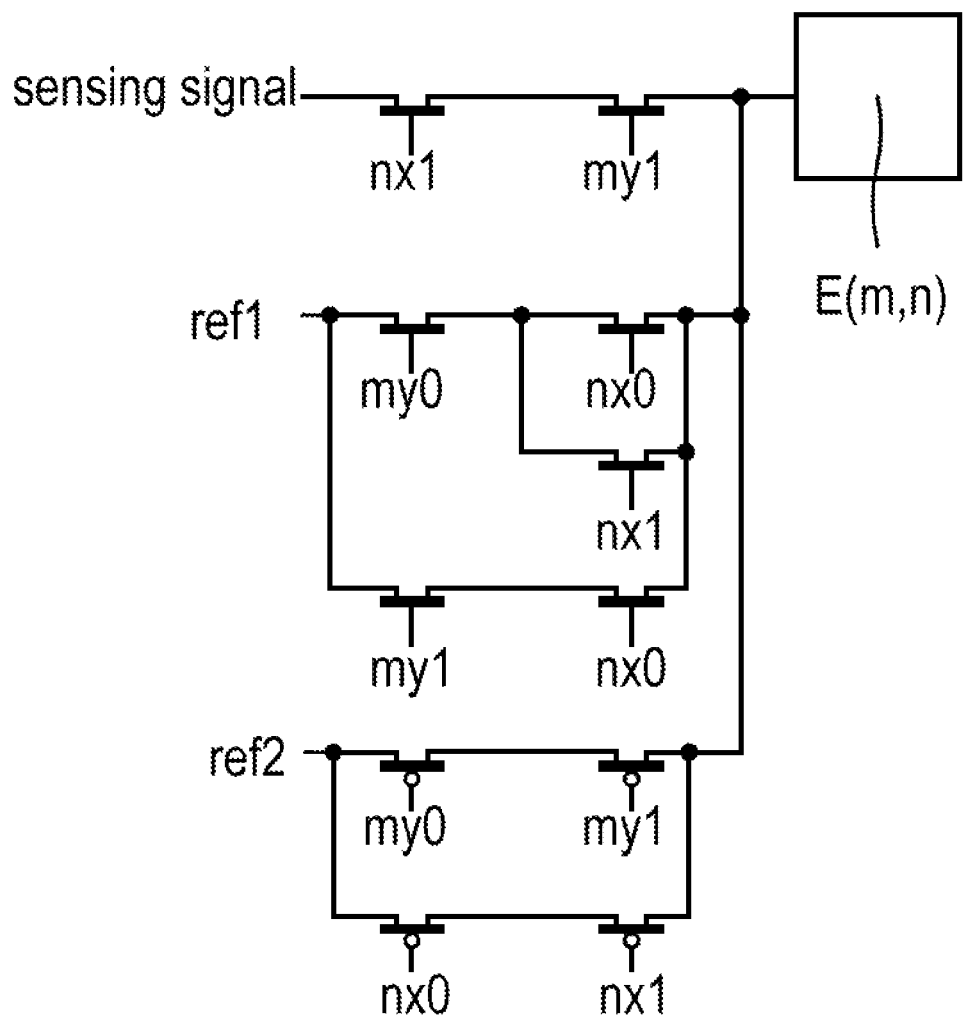
FIG. 19 is a circuit diagram of a selection switch group SW(m,n) of FIG. 16 according to the invention.

FIG. 18 schematically illustrates a switch configuration of the selection switch group SW(m,n) of FIG. 16 according to the invention, which includes a plurality of selection switches to select one of the sensing signal, the first deflection signal, and the second deflection signal to be connected to a corresponding electrode E(m,n). FIG. 19 is a circuit diagram of the selection switch group SW(m,n) of FIG. 16 according to the invention. The selection switch group SW(m,n) is implemented with FETs or TFTs on the substrate 110.

It is known from the aforementioned description that the biometric feature identification device 100 is provided with multi-functional sensing electrodes in order to divide the sensing electrodes into a sensing electrode group and a plurality of corresponding deflection electrode groups and apply a sensing signal, a first sense enhanced deflection signal ref1, and a second sense suppressed deflection signal ref2 when a fingerprint sensing is performed, thereby raising the sensing sensitivity and SNR and increasing the stability and correctness, as well as relatively reducing the device cost on fingerprint sensing.

Figure 20:
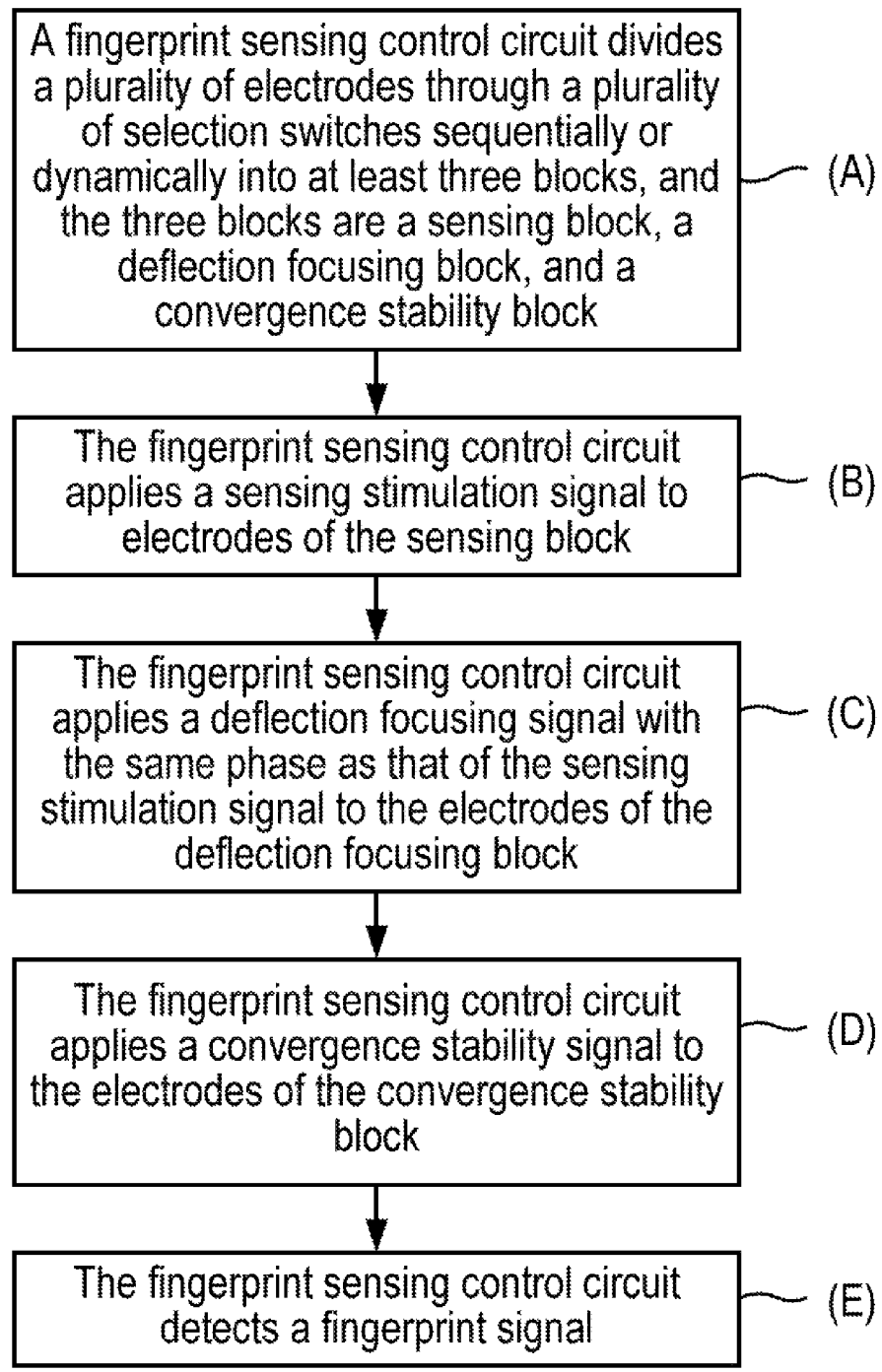
FIG. 20 is a flowchart of a biometric feature identification method according to the invention.
Figure 21:
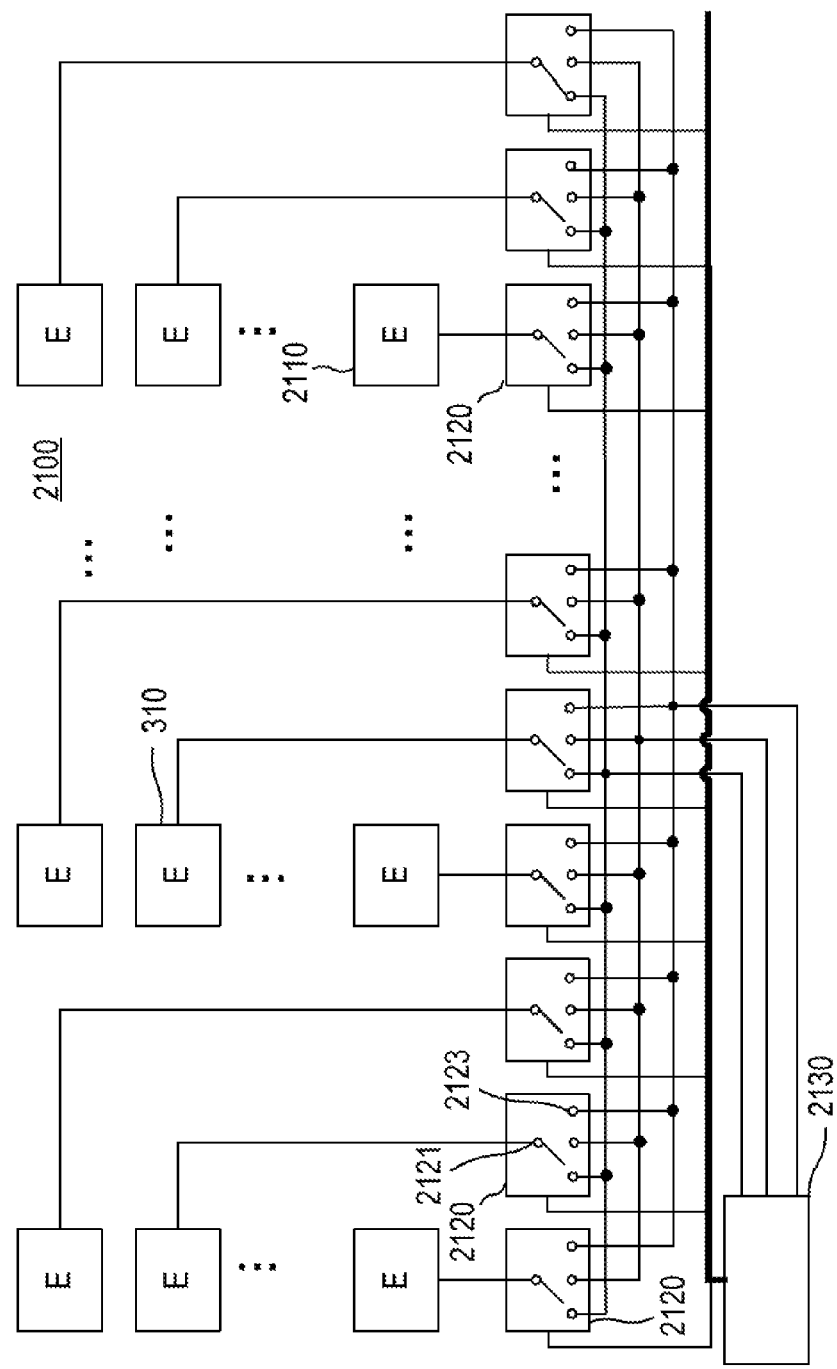
FIG. 21 is a schematic view of a biometric feature identification device using the method of FIG. 20 according to the invention.

FIG. 20 is a flowchart of a biometric feature identification method according to the invention. The biometric feature identification method is used in the aforementioned device 100 of the invention or a simplified biometric feature identification device 2100 with a planar sensing electrode layer as shown in FIG. 21. For convenient description, the simplified biometric feature identification device 2100 with a planar sensing electrode layer is used to describe an operation of the biometric feature identification method, and those skilled in the art can apply the biometric feature identification method in the aforementioned device 100 based on the disclosure of the invention.

FIG. 21 is a schematic view of the simplified biometric feature identification device 2100 with a planar sensing electrode layer according to the invention. The simplified biometric feature identification device 2100 includes a plurality of electrode 2110, a plurality of selection switches 2120, and a fingerprint sensing control circuit 2130. The electrodes 2110 are arranged on a sensing plane in rows and columns. Each of the selection switches 2120 has a plurality of input terminals 2123 and an output terminal connected to one corresponding electrode 2110 in order to selectively output the signal of an input terminal to the output terminal 2121 under a control of the fingerprint sensing control circuit 2130. The fingerprint sensing control circuit 2130 is connected to the input terminals 2123 of the selection switches 2120 in order to control connections between the electrodes 2110 by switching the selection switches 2120.

With reference to FIG. 20 as well as FIG. 21, in step (A), the fingerprint sensing control circuit 2130 divides the electrodes 2110 through the selection switches 2120 sequentially or dynamically into at least three blocks. The three blocks are a sensing block A, a deflection focusing block B, and a convergence stability block C, where the deflection focusing block is comprised of electrodes surrounding the sensing block, and the convergence stability block is comprised of electrodes surrounding the deflection focusing block.

In step (B), the fingerprint sensing control circuit 2130 applies a sensing stimulation signal to the electrodes of the sensing block A.

In step (C), the fingerprint sensing control circuit 2130 applies a deflection focusing signal with the same phase as that of the sensing stimulation signal to the electrodes of the deflection focusing block B.

In step (D), the fingerprint sensing control circuit 2130 applies a convergence stability signal which has a phase opposite to the sensing stimulation signal or a DC signal to the electrodes of the convergence stability block C for detecting a fingerprint signal (step E).

Figure 22A:
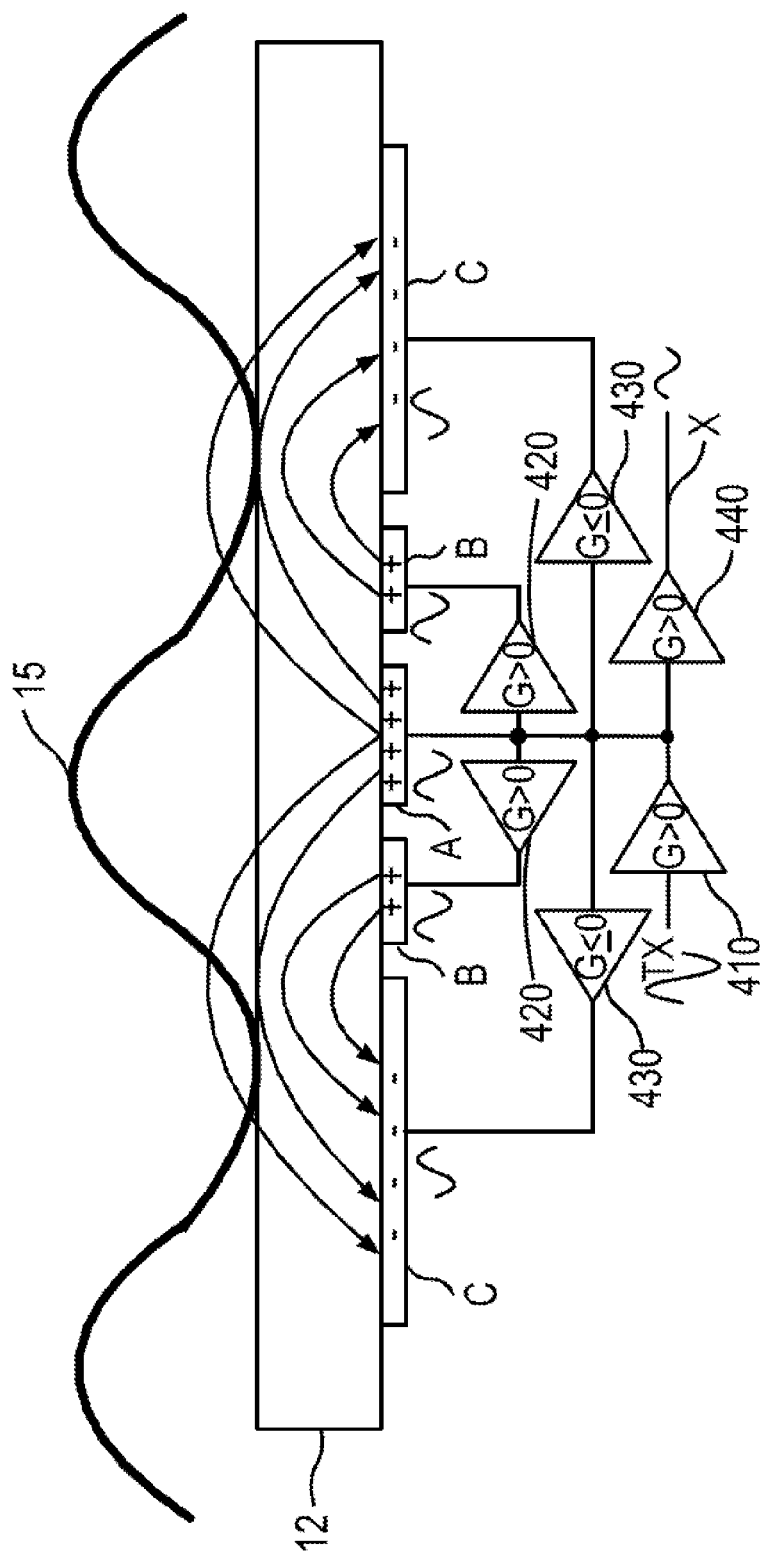
FIGS. 22A and 22B schematically illustrate an operation principle of the device of FIG. 21 according to the invention.
Figure 22B:
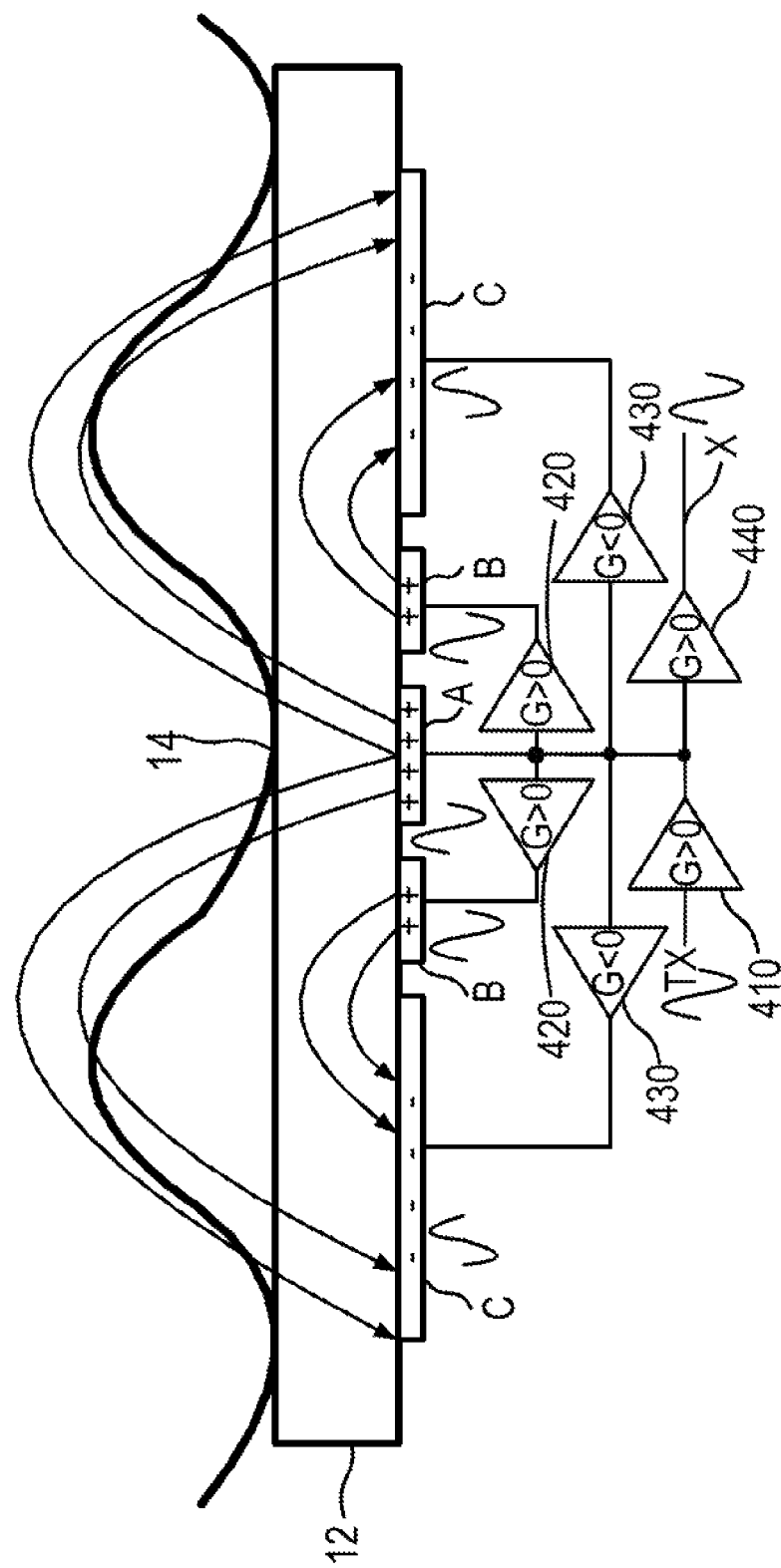

FIGS. 22A and 22B schematically illustrate an operation principle of a biometric feature identification device 2100 according to the invention. As shown in FIG. 22A, below the protection layer 12 covering the plurality of electrodes 2110, there are a sensing block A, a deflection focusing block B, and a convergence stability block C defined by the electrodes 2110, and sizes of the sensing block A, the deflection focusing block B, and the convergence stability block C are not the same because they are comprised of different numbers of the electrodes 2110. A sensing stimulation signal TX is applied to the electrode 2110 of the sensing block A through an amplifier 410, and the signal is subject to be disturbed by an approached living body proximity thereby being transformed into a sensing signal in phase or amplitude. The sensing signal is then amplified by another amplifier 440 to determine whether there is a living body approached.

When there is sensing stimulation signal on the sensing block A and there is no sensing stimulation signal on the deflection focusing block B and the convergence stability block C, the electric flux lines are radiated from the sensing block A to the deflection focusing block B and the convergence stability block C. As shown in FIG. 22A, when there is sensing stimulation signal on the sensing block A, there is a deflection focusing signal with the same polarity as the sensing block A on the deflection focusing block B, and there is convergence stability signal with a polarity opposite to the sensing block on the convergence stability block C, the electric flux lines radiated from the sensing block A are repulsed by the electric flux lines radiated by the deflection focusing block B for being extended far away, and attracted by the electric field of the convergence stability block C for being irradiated to the convergence stability block C according to the electric field attraction and repulsion principle.

Namely, after being processed by the amplifier 410 with a gain greater than zero, the sensing stimulation signal is sent to the sensing block A, which is next processed by the amplifier 420 with a gain greater than zero for being sent to the deflection focusing block B, and processed by the amplifier 430 with a gain smaller than or equal to zero for being sent to the convergence stability block C, thereby allowing the deflection focusing blocks to have the deflection focusing signal with the same polarity as that of the sensing block A and the convergence stability block C to have the convergence stability signal with a polarity opposite to that of the sensing block A. Accordingly, the electric flux lines are extended far away due to mutual repulsion and thus the electric flux lines can penetrate the relatively thick protection layer 12, so that the sensing stimulation signal is more likely to be influenced by an approached living body thereby sensing a larger change of the sensing signal on the sensing block A.

In addition, if the convergence stability block C is not applied with the convergence stability signal with a polarity opposite to that of the sensing block A and thus is floating, the electric flux lines of the sensing block A do not reach the convergence stability block C due to the repulsion of the electric flux lines of the deflection focusing block B. When the convergence stability block C is applied with the convergence stability signal with a polarity opposite to that of the sensing block A, the electric flux lines of the sensing block A reach the convergence stability block C thereby presenting a stable state.

As shown in FIG. 22A, when the sensing block A corresponds to the fingerprint valley 15, i.e., there is air between the protection layer 12 and the fingerprint valley 15, the electric flux lines of the sensing block A reach the convergence block C. As shown in FIG. 22B, when the sensing block A corresponds to the fingerprint ridge 14, the electric flux lines of the sensing block A are raised because the finger is a conductor, and thus the signal sensed at a position X is greater than that of FIG. 22A.

As shown in FIGS. 22A and 22B, the sensing stimulation signal is applied to the sensing block A, and a change of the sensing signal on the sensing block A is measured at the position X, which thus discloses a self-capacitance measurement technique.

Figure 23:
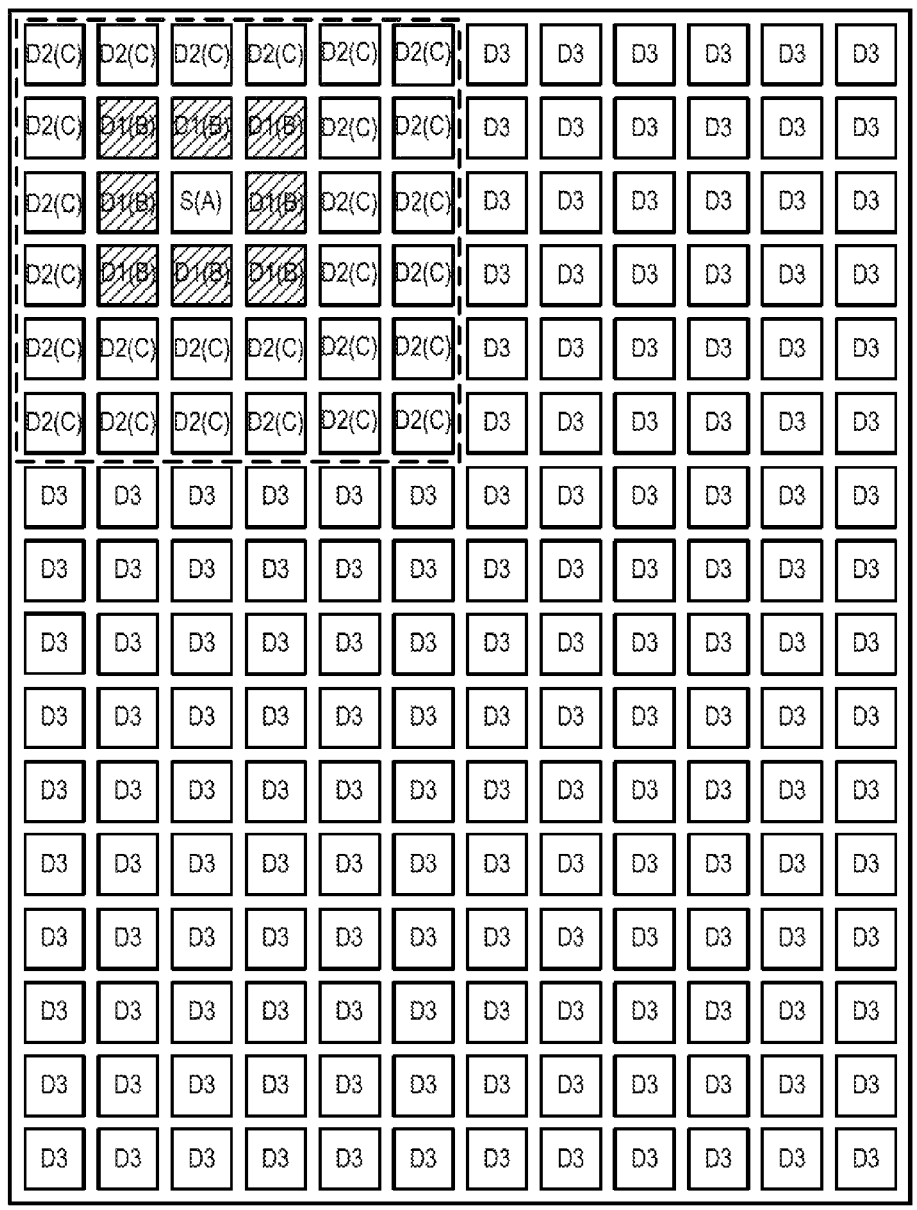
FIG. 23 is another schematic diagram of an electrode layer according to the invention.

FIG. 23 is another schematic diagram of an electrode layer according to the invention, which illustrates that the fingerprint sensing control circuit 2130 divides the electrodes 2110 into a sensing block, a deflection focusing block B, and a convergence stability block C by sequentially or dynamically controlling the selection switches 2120. As shown in FIG. 23, the sensing block A is the electrode S(A), the deflection focusing block B is comprised of electrodes D1(B) surrounding the sensing block A, and the convergence stability block C is comprised of electrodes D2(C) surrounding the deflection focusing block B. The invention can further provide an auxiliary block D' which is comprised of electrodes surrounding the convergence stability block C.

The sensing stimulation signal TX applied to the electrode S(A) of the sensing block A is subject to be disturbed by an approached living body so as to be transformed into the sensing signal in phase or amplitude. The fingerprint sensing control circuit 2130 applies the sensing signal or sensing stimulation signal to pass through a circuit for generating a deflection focusing signal of the same phase which is subsequently applied to the electrodes D1(B) of the deflection focusing block B. The fingerprint sensing control circuit 2130 applies the sensing signal or sensing stimulation signal to pass through a circuit for generating a convergence stability signal of opposite phase which is subsequently applied to the electrodes D2(C) of the convergence stability block C.

Figure 24:
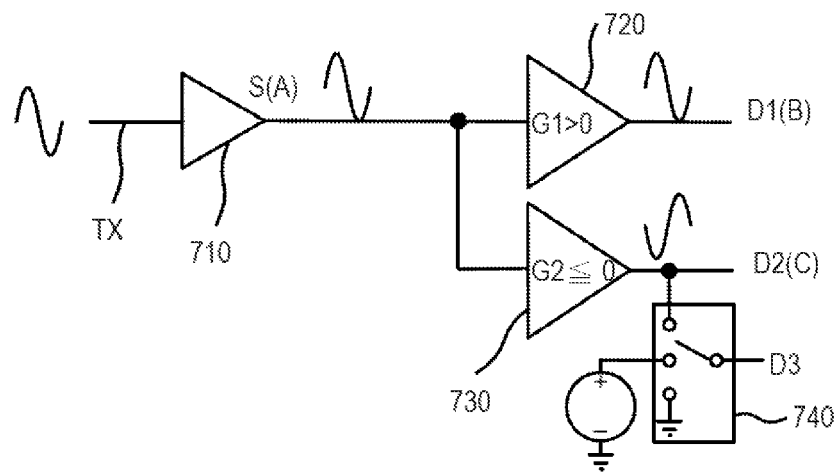
FIG. 24 is a schematic view illustrating a sensing stimulation signal applied to a sensing block by a fingerprint sensing control circuit according to the invention.

FIG. 24 is a schematic view illustrating a sensing stimulation signal applied to the sensing block by the fingerprint sensing control circuit according to the invention. The fingerprint sensing control circuit 2130 outputs a sensing stimulation signal TX. The sensing stimulation signal TX is an AC signal. The sensing stimulation signal TX passes through an amplifier 710 for output to the sensing block A, a first amplifier 720, and a second amplifier 730. The sensing stimulation signal applied to the electrode S(A) of the sensing block A is subject to be disturbed by an approached living body, so as to be transformed into the sensing signal in phase or amplitude.

The first amplifier 720 has a gain G1 greater than zero. The second amplifier 730 has a gain G2 smaller than or equal to zero. The sensing signal or the sensing stimulation signal passes through a circuit (the first amplifier 720) for generating a deflection focusing signal of the same phase which is subsequently applied to the electrodes D2(B) of the deflection focusing block B. The sensing signal or the sensing stimulation signal passes through a circuit (the second amplifier 730) for generating a convergence stability signal of opposite phase which is subsequently applied to the electrodes D2(C) of the convergence stability block C. As shown in FIGS. 23 and 24, the convergence stability signal is sent through a switch 740 to the electrodes of the auxiliary block D' surrounding the convergence stability block C. As shown in FIG. 24, a voltage on the electrodes of the auxiliary block D' is the convergence stability signal. Alternatively, the voltage can be a DC signal or a grounding signal.

Figure 25:
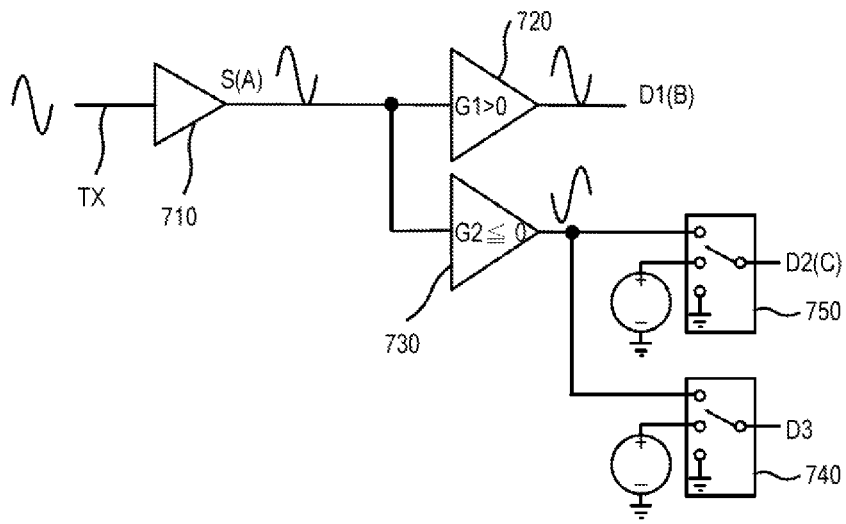
FIG. 25 is another schematic view illustrating a sensing stimulation signal applied to a sensing block by a fingerprint sensing control circuit according to the invention.

FIG. 25 is another schematic view illustrating the sensing stimulation signal applied to a sensing block by the fingerprint sensing control circuit according to the invention. As shown in FIG. 25, a voltage on the electrodes D2 of the convergence stability block C can be the convergence stability signal. Alternatively, the voltage can be a DC signal or a grounding signal. Namely, a DC signal is applied through a switch 750 to the electrodes D2(C) of the convergence stability block C, and it can be a reference voltage or grounding signal.

Figure 26:
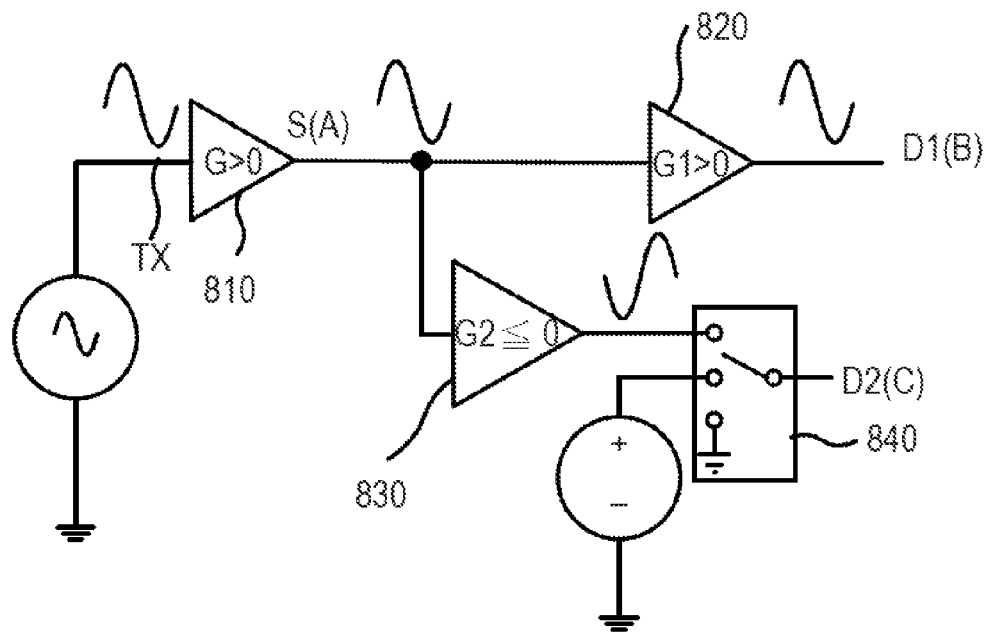
FIG. 26 is a further schematic view illustrating a sensing stimulation signal applied to a sensing block by a fingerprint sensing control circuit according to the invention.

In this embodiment, the electrodes D3 of the auxiliary block D in FIG. 23 surround the convergent stability block C. In other embodiments, the electrodes D3 of the auxiliary block D' can be replaced with the electrodes D2(C) of the convergence stability block C. In this case, the related fingerprint sensing control driving circuit is shown in FIG. 26. FIG. 26 is a further schematic view illustrating the sensing stimulation signal applied to a sensing block by the fingerprint sensing control circuit according to the invention.

Figure 27:
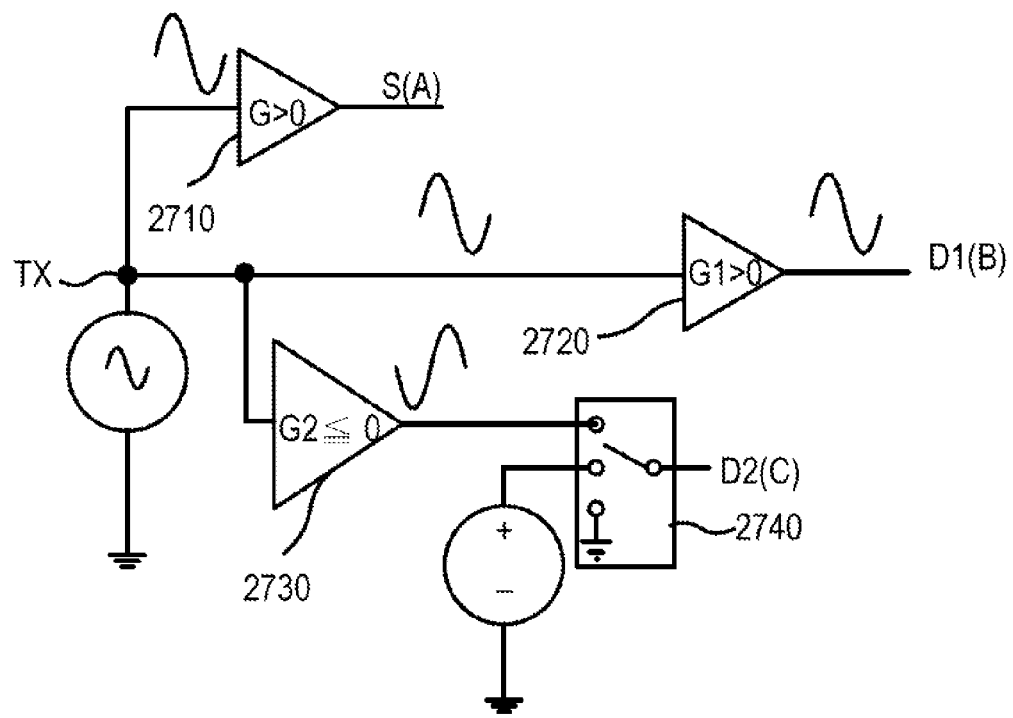
FIG. 27 is a schematic view of a driving circuit according to the invention.

FIG. 27 is a schematic view of a driving circuit according to the invention, which is different from FIG. 26 in that the sensing stimulation signal TX is directly outputted to a first amplifier 2720 and a second amplifier 2730, but not passing through the amplifier 2710 for output to the electrode S(A) of the sensing block A and the first and second amplifiers 2720 2730.

Figure 28:
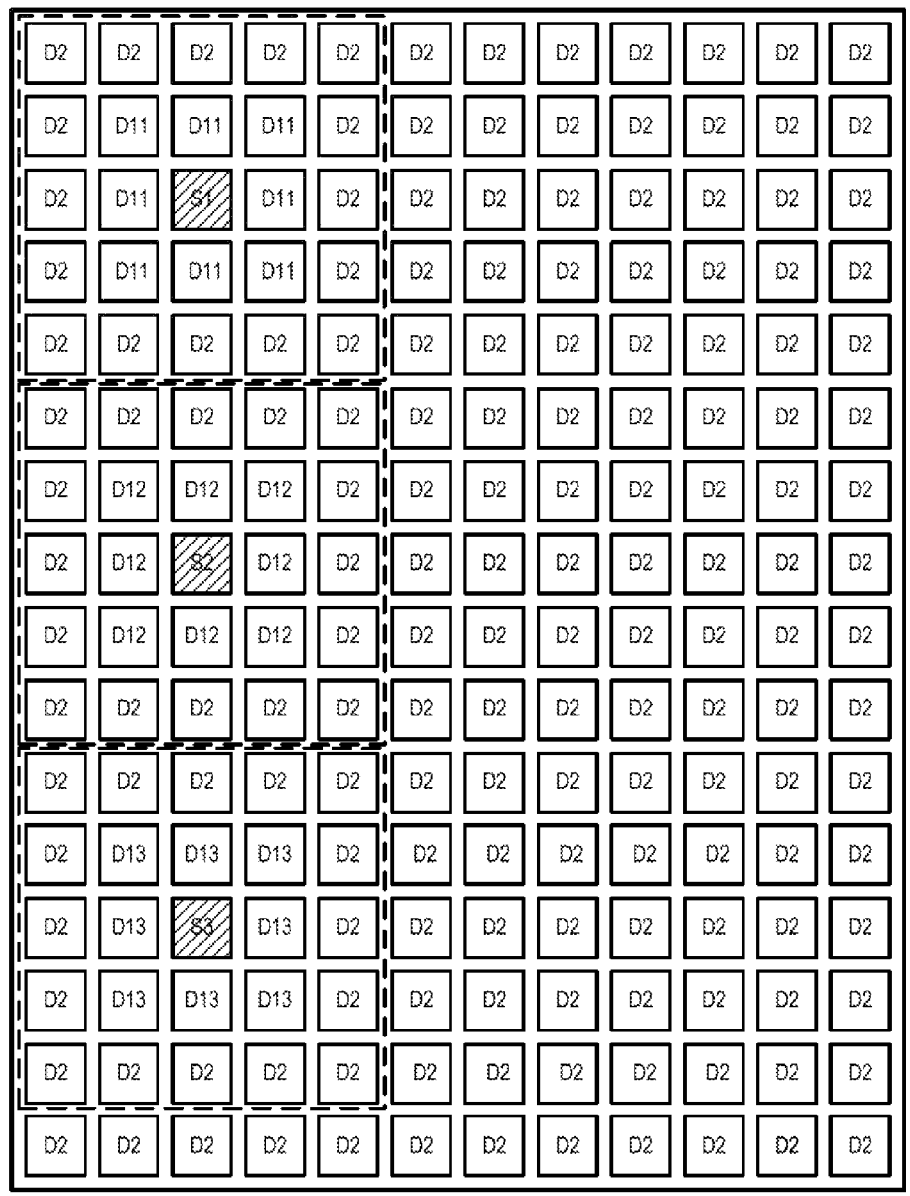
FIG. 28 is still another schematic diagram of an electrode layer according to the invention.
Figure 29:
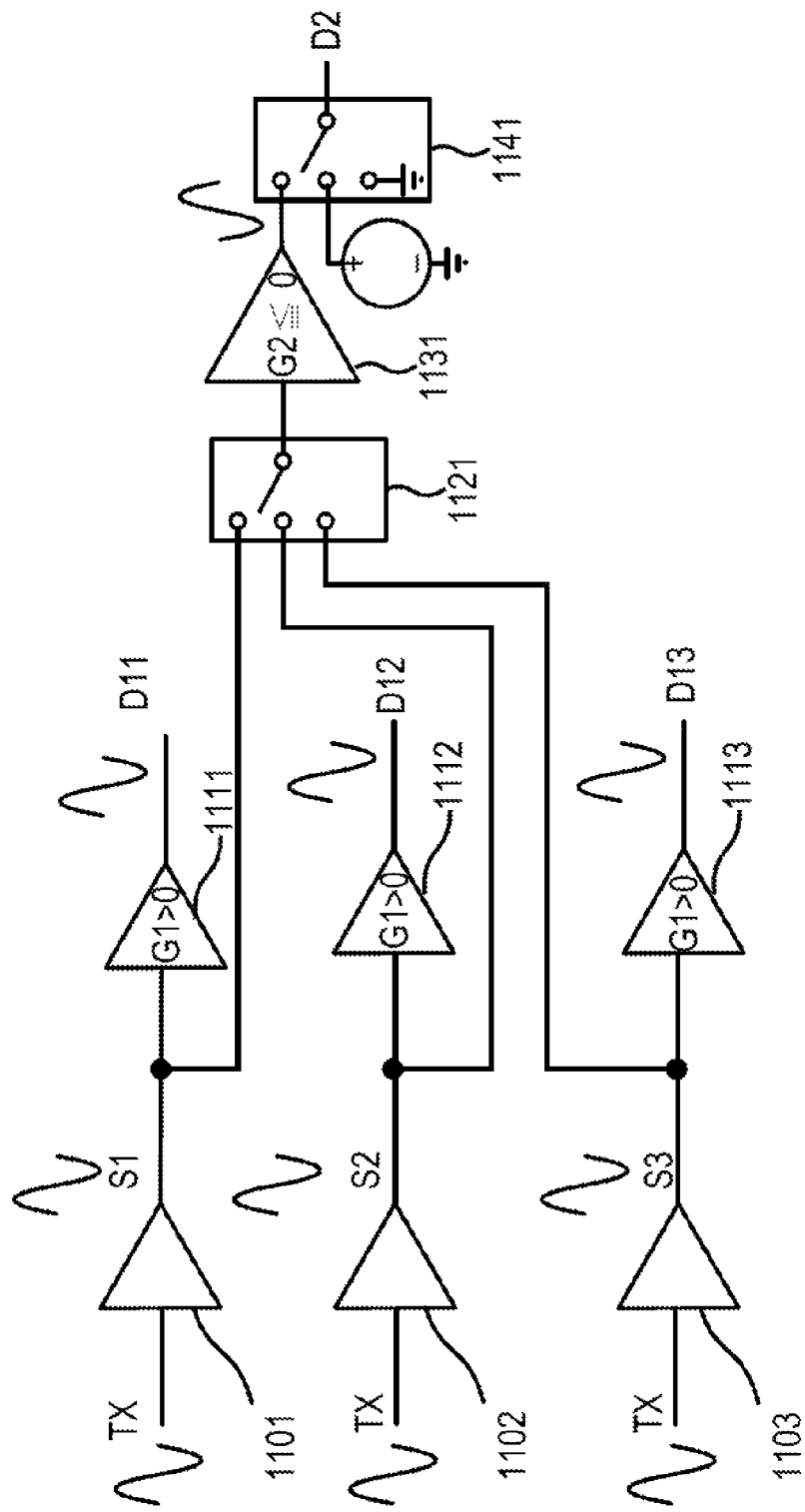
FIG. 29 is a schematic view of another driving circuit according to the invention.

FIG. 28 is still another schematic diagram of an electrode layer according to the invention, which is similar to that of FIG. 23 except that, in FIG. 28, there are a plurality of sensing blocks A used for concurrently performing a sensing operation, and the electrodes D3 of the auxiliary blocks D' are replaced with the electrodes D2(C) of the convergence stability blocks C. In this embodiment, the related driving circuit is shown in FIG. 29. FIG. 29 is a schematic view of another driving circuit according to the invention. As shown in FIG. 29, the sensing stimulation signal TX is applied to the electrodes S1, S2, S3 of the sensing blocks A by respective amplifiers 1101, 1102, 1103. The sensing stimulation signal TX on the electrodes S1, S2, S3 of the sensing blocks A is subject to be disturbed by an approached living body so as to be transformed into the sensing signal in phase or amplitude. The sensing signal or the sensing stimulation signal passes through the first amplifiers 1111, 1112, 1113 respectively to generate a plurality of deflection focusing signals of the same phase for being applied to respective electrodes D11, D12, D13 of the deflection focusing blocks B. A switch 1121 is used to select one of the sensing signals, and the selected sensing signal passes through an amplifier 1131 to generate a convergence stability signal of opposite phase for being applied to the electrodes D2 of the convergence stability block C through the switch 1141. As a result, the voltage on the electrodes D2 of the block C can be the convergence stability signal, a DC signal, or a grounding signal.

Figure 30:
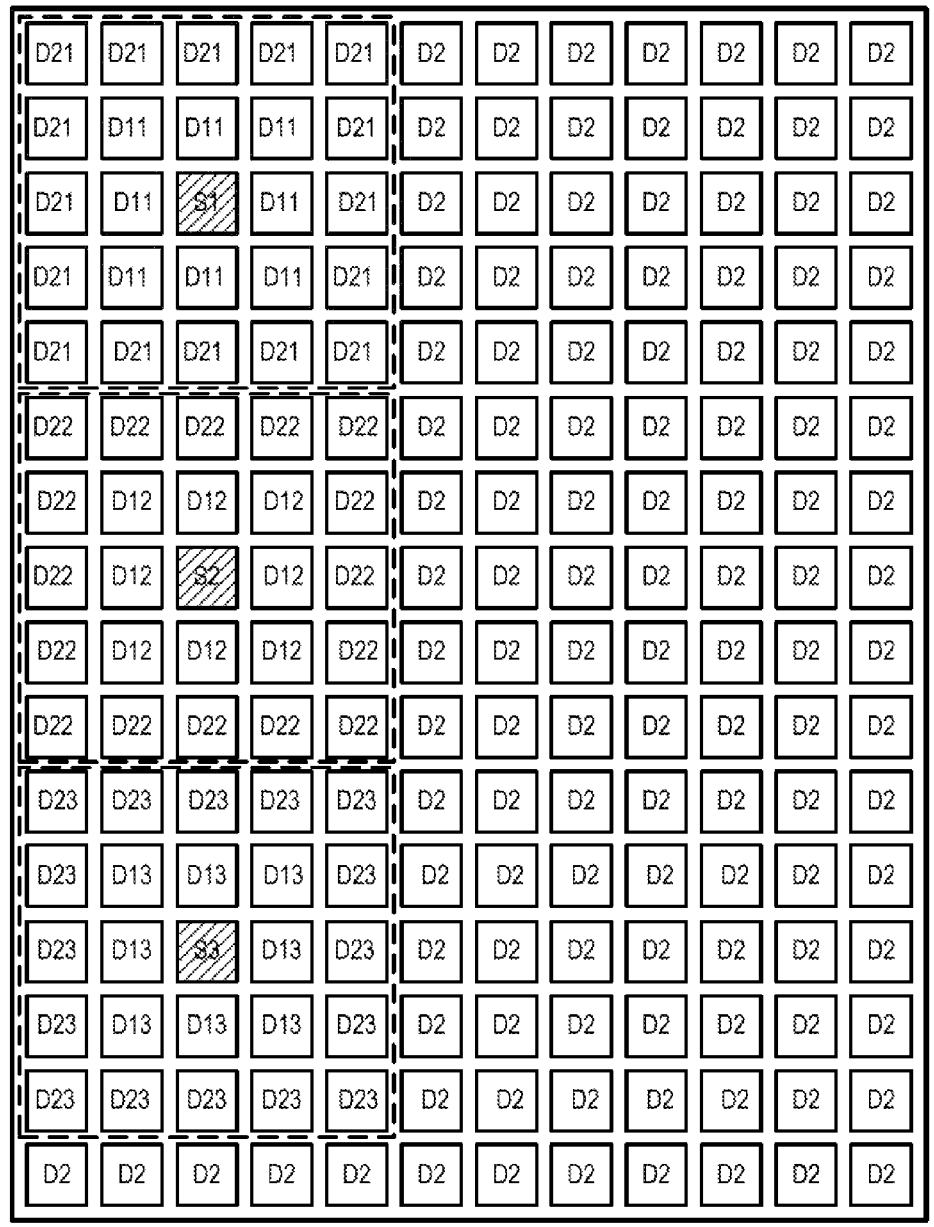
FIG. 30 is still another schematic diagram of an electrode layer according to the invention.
Figure 31:
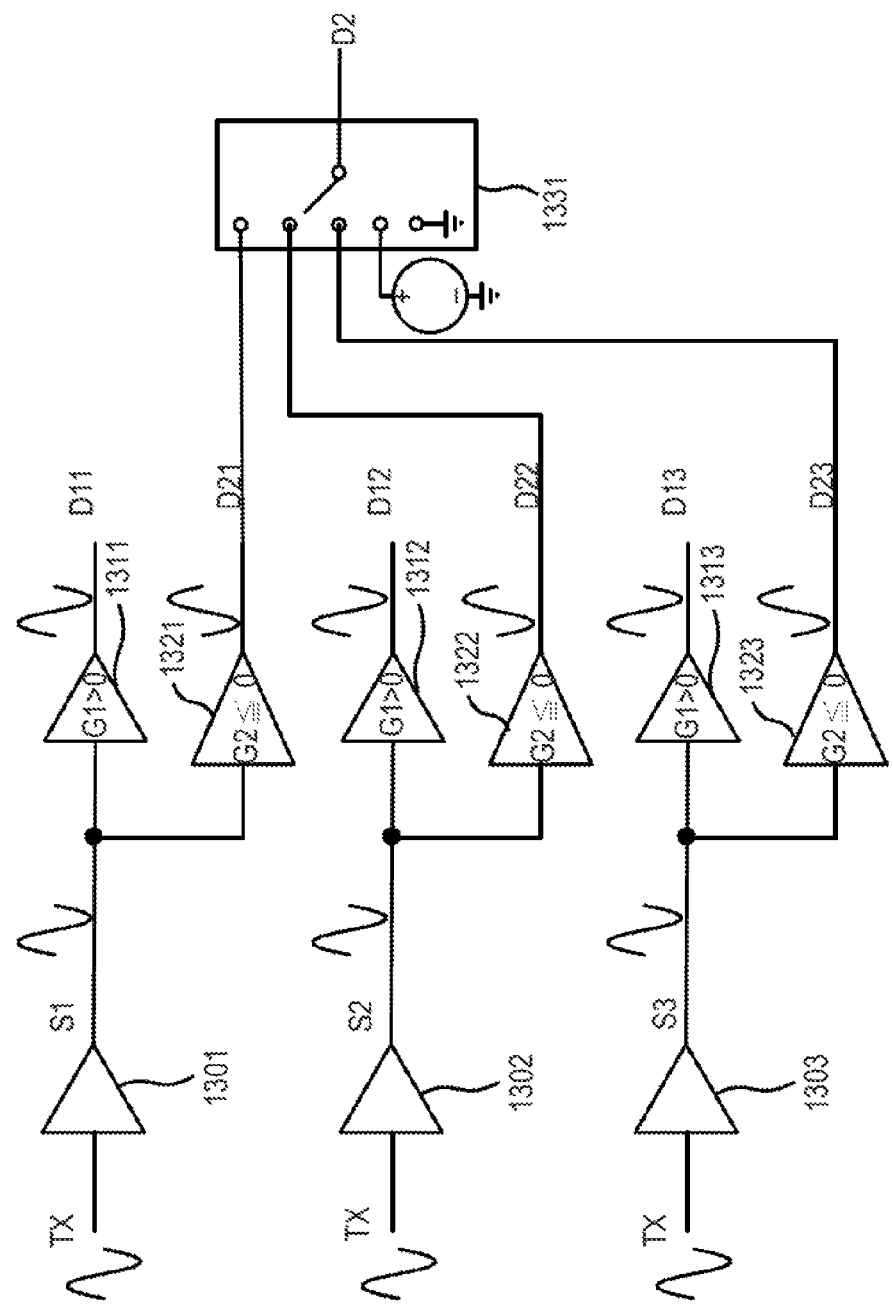
FIG. 31 is a schematic view of still another driving circuit according to the invention.

FIG. 30 is still another schematic diagram of an electrode layer according to the invention, which is similar to that of FIG. 28 except that, in FIG. 30, in relation to the electrodes S1, S2, S3 of the sensing blocks A, the signals applied to the electrodes of the deflection focusing blocks and the electrodes of the convergence stability blocks are different. In this case, the related driving circuit is shown in FIG. 31. FIG. 31 is a schematic view of still another driving circuit according to the invention. As shown in FIG. 31, the sensing stimulation signal TX is applied to the electrodes S1, S2, S3 through respective amplifiers 1301, 1302, 1303 of the sensing blocks A. The sensing stimulation signal TX on the electrodes S1, S2, S3 of the sensing blocks A is subject to be disturbed by an approached living body so as to be transformed into the sensing signal. The sensing signal or the sensing stimulation signal passes through the amplifiers 1311, 1312, 1313 respectively to generate a plurality of deflection focusing signals of the same phase for being applied to respective electrodes D11, D12, D13 of the deflection focusing blocks B. The sensing signal or the sensing stimulation signal passes through the amplifiers 1321, 1322, 1323 to generate a plurality of convergence stability signals of opposite phase for being applied to the respective electrodes D21, D22, D23 of the convergence stability blocks C. A switch 1331 is used to select one of the convergence stability signals of opposite phase, and the selected convergence stability is applied to the electrodes D2 of the auxiliary block D' through the switch 1331. As a result, the voltage on the electrodes D2 of the block D' can be the convergence stability signal, a DC signal, or a grounding signal.

As cited, the fingerprint sensing control circuit 2130 inputs the sensing signal to a self-capacitance sensing circuit for detecting a fingerprint. Alternatively, the fingerprint sensing control circuit 2130 can sequentially select at least one of the electrodes of the convergence stability block C and input the sensing signal on the selected electrode to a detection circuit for detecting a fingerprint. Namely, in this case, the electrodes of the sensing blocks A act as the side of transmitting the sensing stimulation signal in a mutual-capacitance sensing technique, and the electrodes of the convergence stability blocks C act as the side of receiving the sensing signal, so that the mutual-capacitance sensing technique is performed. In other embodiments, the fingerprint sensing control circuit 2130 electrically connects a plurality of electrodes of the convergence stability block C to form a receiving electrode and inputs the sensing signal on the receiving electrode to a detection circuit for detecting a fingerprint.

Figure 32:
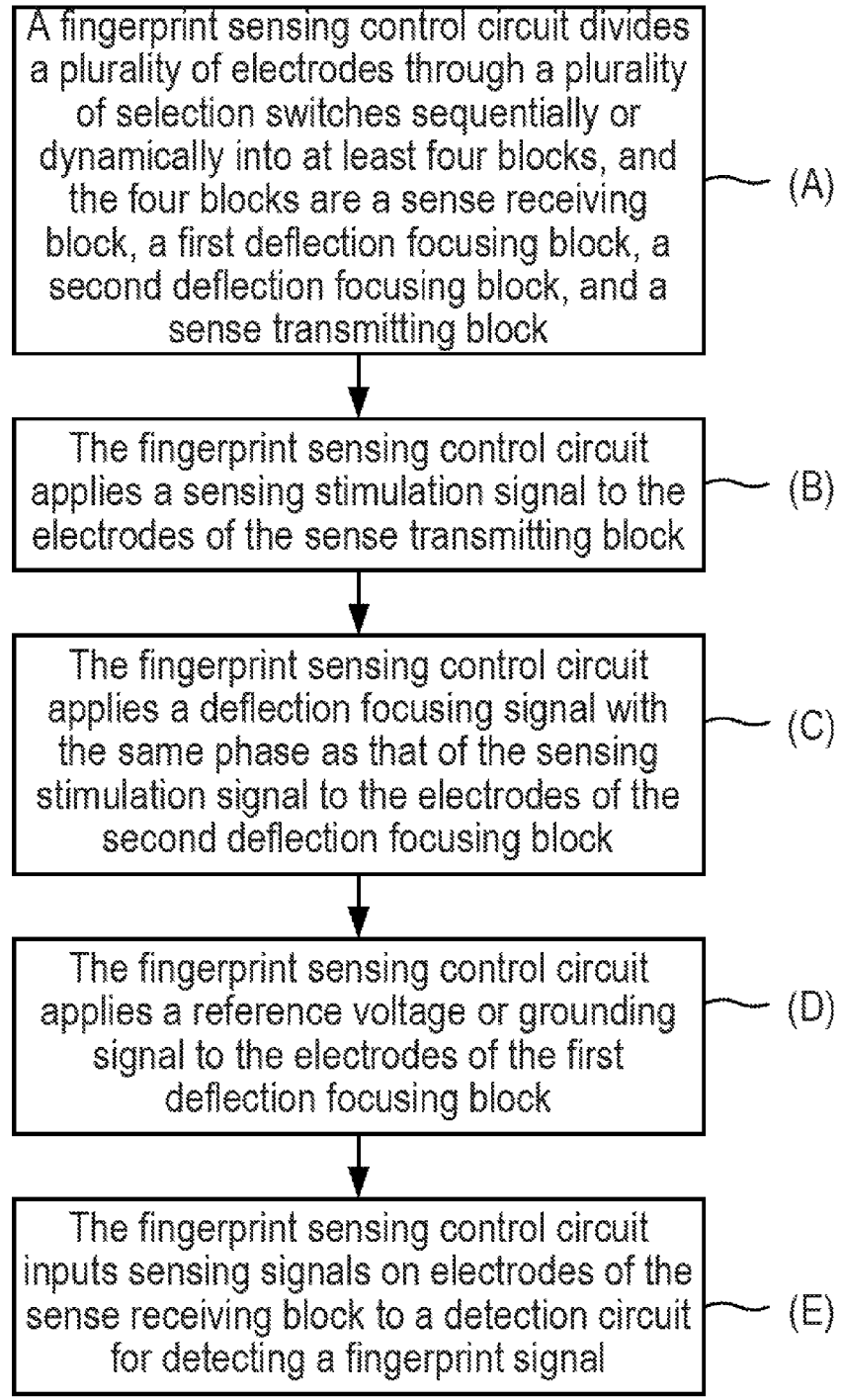
FIG. 32 is a flowchart of a fingerprint identification method according to the invention.

In another embodiment, the fingerprint sensing control circuit 2130 is based on the circuit of FIG. 21 to sequentially or dynamically divide the selection switches 2120 into at least four blocks, namely a sense receiving block A, a first deflection focusing block B, a second deflection focusing block C, and a sense transmitting block D. The fingerprint sensing control circuit 2130 applies a signal to the first deflective focus block B, the second deflective focus block C, and the sense transmitting block D, respectively, for detecting a fingerprint signal. FIG. 32 is a flowchart of a fingerprint identification method according to the invention.

With reference to FIG. 32, in step (A), the fingerprint sensing control circuit 2130 divides the plurality of electrodes 2110 through the plurality of selection switches 2120 sequentially or dynamically into at least four blocks, and the four blocks are the sense receiving block A, the first deflection focusing block B, the second deflection focusing block C, and the sense transmitting block D. The deflection focusing block B is comprised of electrodes surrounding the sense receiving block A. The second deflection focusing block C is comprised of electrodes surrounding the first deflection focusing block B. The sense transmitting block D is comprised of electrodes surrounding the second deflection focusing block C.

In step (B), the fingerprint sensing control circuit applies a sensing stimulation signal to the electrodes of the sense transmitting block D.

In step (C), the fingerprint sensing control circuit applies a deflection focusing signal with the same phase as that of the sensing stimulation signal to the electrodes of the second deflection focusing block C.

In step (D), the fingerprint sensing control circuit applies a reference voltage or grounding signal to the electrodes of the first deflection focusing block B.

In step (E), the fingerprint sensing control circuit inputs sensing signals on electrodes of the sense receiving block A to a detection circuit for detecting a fingerprint signal.

Figure 33A:
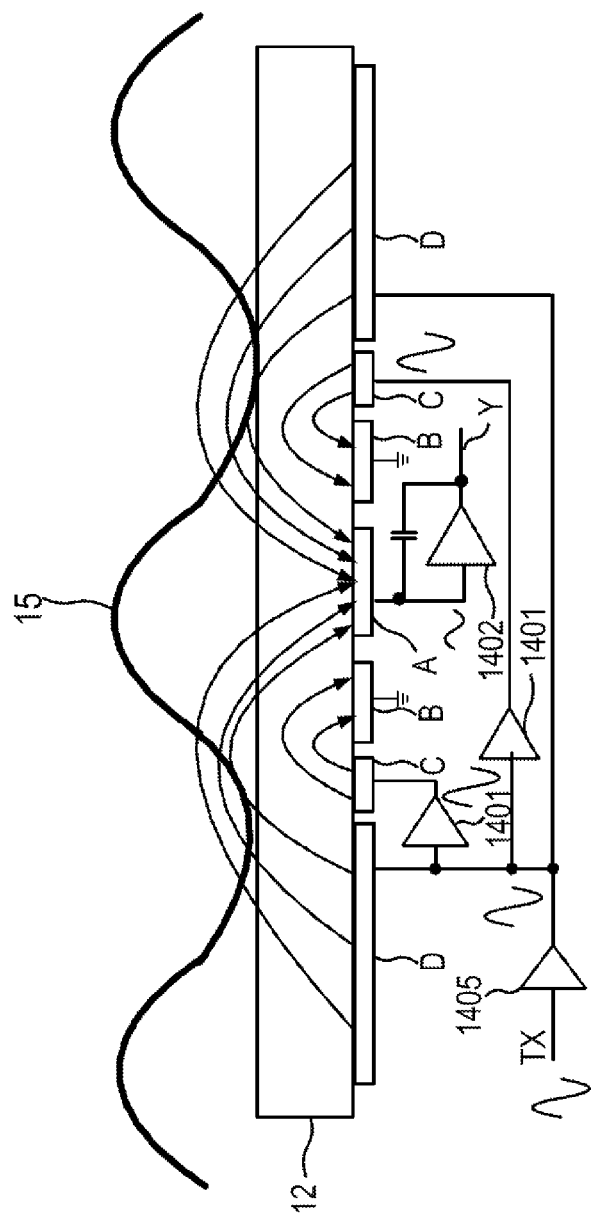
FIGS. 33A and 33B schematically illustrate an operation principle of a biometric feature identification device according to the invention.
Figure 33B:
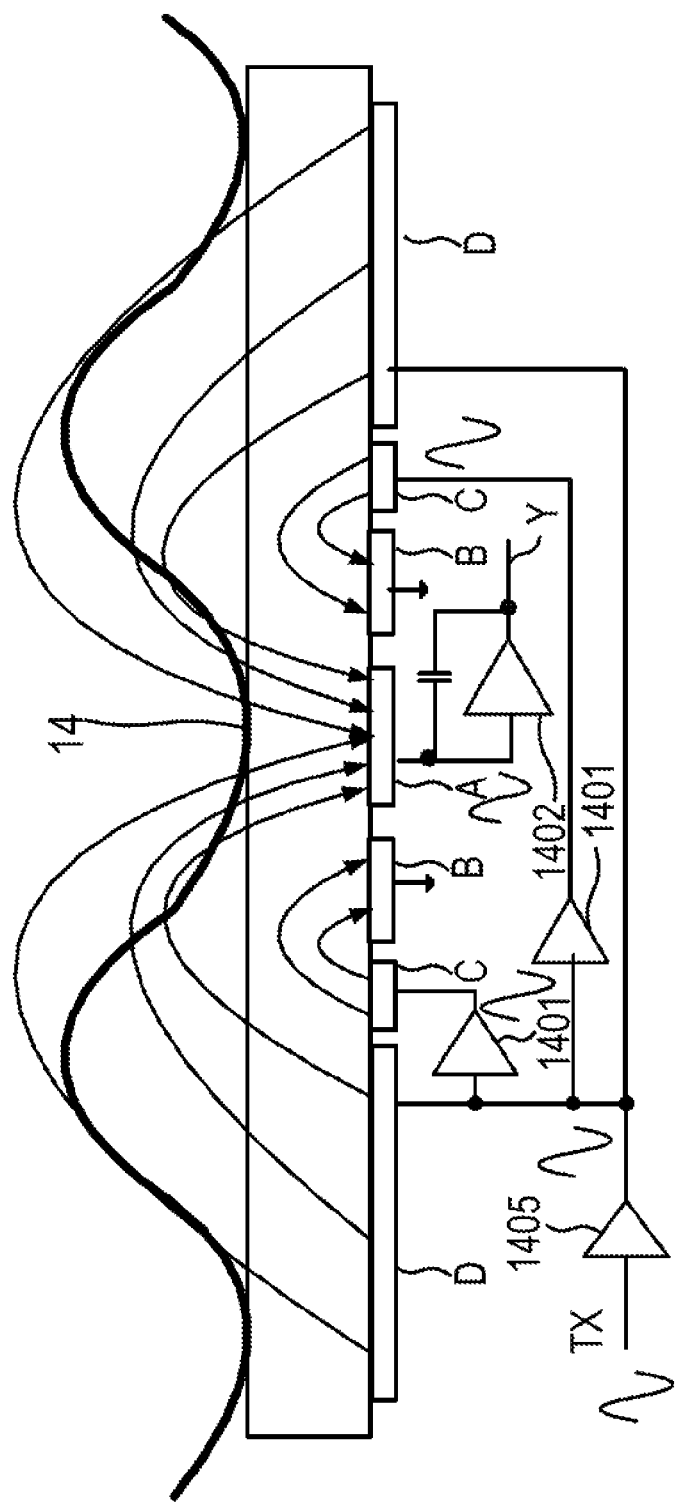

FIGS. 33A and 33B schematically illustrate an operation principle of a biometric feature identification device according to the invention. As shown in FIGS. 33A and 33B, the sizes of the sense receiving block A, the first deflection focusing block B, the second deflection focusing block C, and the sense transmitting block D are not the same because they are comprised of different numbers of the electrodes 2110.

As shown in FIG. 33A, a sensing stimulation signal TX is applied to the electrodes of the sense transmitting block D through an amplifier 1405 and to the electrodes of the second deflection focusing block C through an amplifier 1401, and the electrodes of the first deflection focusing block B are grounded. In this case, since the electrodes of the first deflection focusing block B are grounded and closest to the electrodes of the second deflective focus block C, the electric flux lines of the electrodes are radiated from the second deflection focusing block C to the first deflection focusing block B. Furthermore, the electric flux lines radiated by the electrodes of the sense transmitting block D are repulsed by those radiated by the electrodes of the second deflection focusing block C for being extended far away, so that the electric flux lines are radiated from electrodes of the sense transmitting block D toward the electrodes of the sense receiving block A. Because the electric flux lines radiated from electrodes of the sense transmitting block D are extended far away to pass through the relatively thick protection layer 12, the electric flux lines are more likely to be influenced by an approached living body, thereby sensing a larger change of the sensing signal on the sense receiving block A.

As shown in FIG. 33A, when the sense receiving block A corresponds to the fingerprint valley 15, i.e., there is air between the protection layer 12 and the fingerprint valley 15, the electric flux lines of the sense transmitting block D reach the sense receiving block A. As shown in FIG. 33B, when the sensing block A corresponds to the fingerprint ridge 14, the electric flux lines of the sense transmitting block D are raised because the finger is a conductor, and thus the signal sensed at a position Y is greater than that of FIG. 33A.

With reference to FIGS. 33A and 33B, the sensing stimulation signal is applied to the sense transmitting block D, and a change (at the position Y) of the sensing signal on the sense receiving block A is measured, which thus discloses a mutual-capacitance measurement technique.

Figure 34:
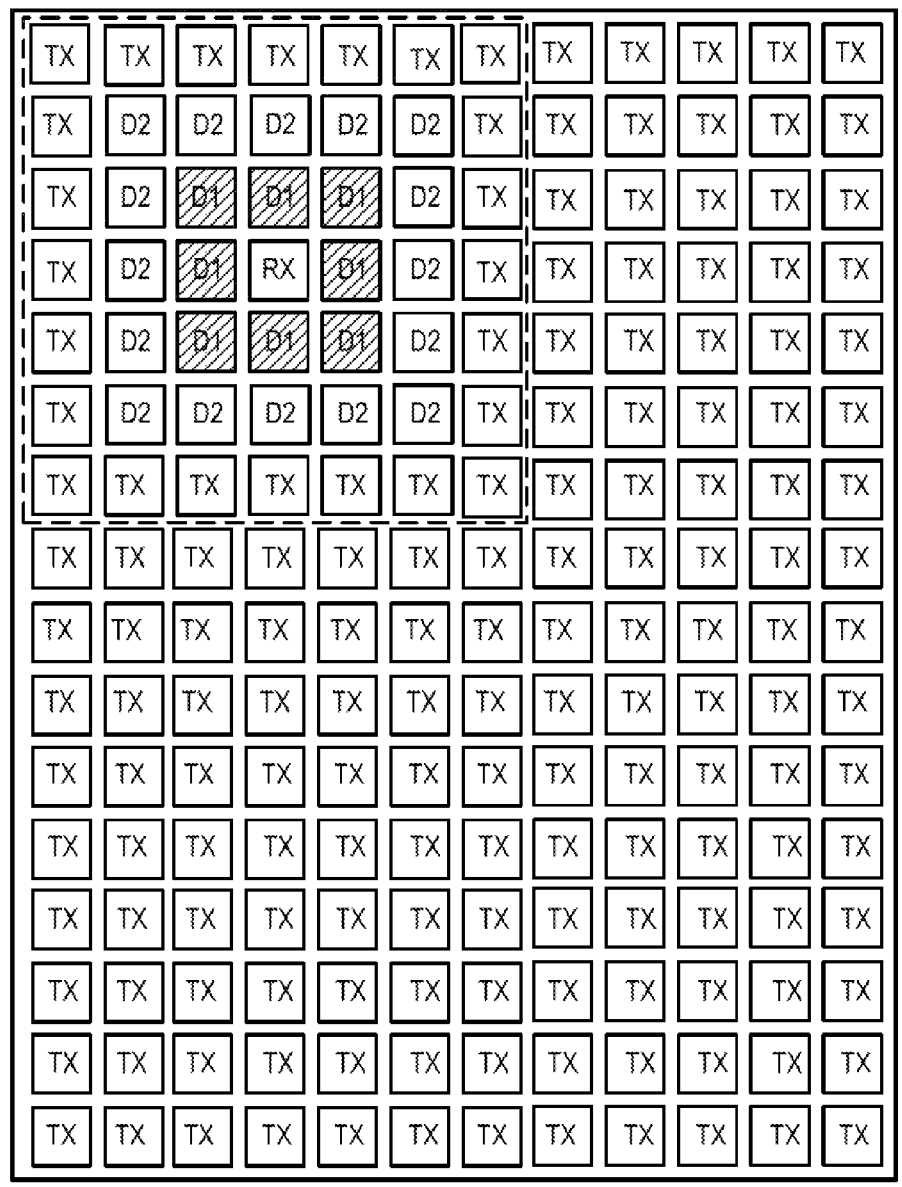
FIG. 34 is yet another schematic diagram of an electrode layer according to the invention.

FIG. 34 is yet another schematic diagram of an electrode layer according to the invention, which illustrates that the fingerprint sensing control circuit 2130 divides the electrodes 2110 into at least four blocks, i.e., a sense receiving block A, a first deflection focusing block B, a second deflection focusing block C, a sense transmitting block D, by sequentially or dynamically controlling the selection switches 2120. As shown in FIG. 34, the sense receiving block A is the electrode RX, the first deflection focusing block B is comprised of electrodes D1 surrounding the block A, the second deflection focusing block C is comprised of electrodes D2 surrounding the block B, and the sense transmitting block D is comprised of electrodes TX surrounding the block C.

The fingerprint sensing control circuit 2130 applies a sensing stimulation signal to the electrodes of the block D through an amplifier 1405. The sensing stimulation signal is an AC signal. The fingerprint sensing control circuit 2130 applies the sensing stimulation signal to pass through a circuit (an amplifier 1401) for generating an deflection focusing signal of the same phase which is subsequently applied to the electrodes of the block C. The fingerprint sensing control circuit 2130 applies a reference voltage or grounding signal to the electrodes of the block B. The fingerprint sensing control circuit 2130 receives the sensing signal through the amplifier 1402 and inputs it to a detection circuit for detecting a fingerprint.

As cited, the biometric feature identification device 2100 of the invention is provided with a plurality of electrodes, a plurality of switches, and a fingerprint sensing control circuit. The electrodes can be prearranged into three blocks or divided into at least three blocks, i.e., a sensing block, a deflection focusing block, and a convergence stability block, by the switches. First, the electrode of a selected sensing block is applied with a sensing signal. Next, the electrodes of the deflection focusing block are applied with a deflection focusing signal with the same phase as that of the sensing stimulation signal, which can cancel the parasitic capacitance between the blocks and also concentrate and raise the electric flux lines of the sensing block, thereby increasing the sensing sensitivity, enlarging the effective sensing distance, enhancing the SNR, raising the signal stability and accuracy, and relatively reducing the cost of the fingerprint sensing device.

Although the present invention has been explained in relation to its preferred embodiment, it is to be understood that many other possible modifications and variations can be made without departing from the spirit and scope of the invention as hereinafter claimed.

What is claimed is:

1. A biometric feature identification device, comprising:
   a substrate;
   an electrode layer arranged at one side of the substrate and having a plurality of electrodes; and
   a switch and trace layer including a plurality of selection switches and a plurality of traces, the selection switches dividing the electrodes sequentially or dynamically into at least one sensing electrode group and a plurality of deflection electrode groups corresponding thereto, wherein each sensing electrode group corresponds to at least two deflection electrode groups, each sensing electrode group has at least one electrode for sensing, and each deflection electrode group has a plurality of electrodes for deflection.

2. The biometric feature identification device as claimed in claim 1, wherein the selection switches are divided into a plurality of selection switch groups, and each selection switch group is comprised of at least one switch corresponding to at least one electrode.

3. The biometric feature identification device as claimed in claim 2, wherein each of the traces is electrically connected to at least one selection switch group.

4. The biometric feature identification device as claimed in claim 1, further comprising an electrode shielding layer arranged between the electrode layer and the switch and trace layer.

5. The biometric feature identification device as claimed in claim 4, further comprising an insulating layer arranged between the electrode layer and the electrode shielding layer.

6. The biometric feature identification device as claimed in claim 1, wherein the selection switches are field effect transistors or thin film transistors arranged on the substrate.

7. The biometric feature identification device as claimed in claim 1, further comprising at least one signal amplifier with a positive gain.

8. The biometric feature identification device as claimed in claim 7, wherein the at least one signal amplifier has an input terminal electrically connected to one sensing electrode group and an output terminal electrically connected to at least one deflection electrode group.

9. The biometric feature identification device as claimed in claim 7, wherein the at least one signal amplifier is arranged on the substrate or in an integrated circuit.

10. The biometric feature identification device as claimed in claim 7, wherein the positive gain of the at least one signal amplifier is programmable.

11. The biometric feature identification device as claimed in claim 1, further comprising at least one signal amplifier with a negative gain.

12. The biometric feature identification device as claimed in claim 11, wherein the at least one signal amplifier has an input terminal electrically connected to one sensing electrode group and an output terminal electrically connected to at least one deflection electrode group.

13. The biometric feature identification device as claimed in claim 11, wherein the at least one signal amplifier is arranged on the substrate or in an integrated circuit.

14. The biometric feature identification device as claimed in claim 11, wherein the negative gain of the at least one signal amplifier is programmable.

15. The biometric feature identification device as claimed in claim 1, wherein each first deflection electrode group is comprised of a plurality of electrodes surrounding one corresponding sensing electrode group, and each second deflection electrode group is comprised of a plurality of electrodes surrounding one corresponding first deflection group.

16. The biometric feature identification device as claimed in claim 15, wherein each third deflection electrode group is comprised of a plurality of electrodes surrounding one corresponding second deflection electrode group.

17. The biometric feature identification device as claimed in claim 7, wherein the selection switches couple electrical signal on one selected sensing electrode group to an input terminal of the at least one signal amplifier with a positive gain corresponding to the selected sensing electrode group, and couple output signal of the at least one signal amplifier with a positive gain to one first deflection electrode group corresponding to the selected sensing electrode group.

18. The biometric feature identification device as claimed in claim 11, wherein the selection switches couple electrical signal on one selected sensing electrode group to an input terminal of the at least one signal amplifier with a negative gain corresponding to the selected sensing electrode group, and couple output signal of the at least one signal amplifier with a negative gain to one second deflection electrode group corresponding to the selected sensing electrode group.

19. The biometric feature identification device as claimed in claim 15, wherein the selection switches connect a first deflection signal to the first deflection electrode group, and the first deflection signal is a zero voltage, positive voltage, negative voltage, or AC signal.

20. The biometric feature identification device as claimed in claim 15, wherein the selection switches connect a second deflection signal to the second deflection electrode group, and the second deflection signal is a zero voltage, positive voltage, negative voltage, or AC signal.

21. The biometric feature identification device as claimed in claim 16, wherein the selection switches connect a third deflection signal to the third deflection electrode group, and the first deflection signal is a zero voltage, positive voltage, negative voltage, or AC signal.

22. The device as claimed in claim 1, further comprising a protection layer disposed at one surface of the electrode layer.

23. A biometric feature identification method executed in a biometric feature identification device having a plurality of electrodes arranged on a sensing plane in rows and columns, a plurality of selection switches connected to the electrodes respectively, and a fingerprint sensing control circuit for switching the selection switches to control connections between the electrodes and a sensing circuit and between the electrodes, the method comprising:
the fingerprint sensing control circuit dividing the electrodes through the selection switches sequentially or dynamically into at least three blocks, the three blocks being a sensing block, a deflection focusing block, and a convergence stability block, wherein the deflection focusing block is comprised of electrodes surrounding the sensing block, and the convergence stability block is comprised of electrodes surrounding the deflection focusing block;
the fingerprint sensing control circuit applying a sensing stimulation signal to electrodes of the sensing block;
the fingerprint sensing control circuit applying a deflection focusing signal with a same phase as that of the sensing stimulation signal to the electrodes of the deflection focusing block; and
the fingerprint sensing control circuit applying a convergence stability signal to the electrodes of the convergence stability block for detecting a fingerprint signal.

24. The biometric feature identification method as claimed in claim 23, wherein the sensing stimulation signal is an AC signal.

25. The biometric feature identification method as claimed in claim 24, wherein the sensing stimulation signal applied to the electrodes of the sensing block is disturbed by an approached living body so as to be transformed into a sensing signal which is different in phase or amplitude, and complete a self-capacitance measurement.

26. The biometric feature identification method as claimed in claim 25, wherein the sensing signal or sensing stimulation signal passes through a first circuit for generating the deflection focusing signal.

27. The biometric feature identification method as claimed in claim 26, wherein the sensing signal or sensing stimulation signal passes through a second circuit for generating the convergence stability signal with a phase in opposition thereto.

28. The biometric feature identification method as claimed in claim 23, wherein a DC signal is applied to the electrodes of the convergence stability block.

29. The biometric feature identification method as claimed in claim 28, wherein the DC signal applied to the electrodes of the convergence stability block is a reference voltage or grounding signal.

30. The biometric feature identification method as claimed in claim 27, wherein the fingerprint sensing control circuit inputs the sensing signal to a self-capacitance sensing circuit for detecting the fingerprint signal.

31. The biometric feature identification method as claimed in claim 23, wherein the fingerprint sensing control circuit sequentially selects at least one electrode from the convergence stability block and inputs a sensing signal on the at least one electrode to a detection circuit for detecting the fingerprint signal thereby completing a mutual-capacitance measurement.

32. The biometric feature identification method as claimed in claim 23, wherein the fingerprint sensing control circuit connects the electrodes of the convergence stability block to form a receiving electrode and inputs the sensing signal on the receiving electrode to a detection circuit for detecting a fingerprint signal thereby completing a mutual-capacitance measurement.

33. A biometric feature identification method executed in a biometric feature identification device having a plurality of electrodes arranged on a sensing plane in rows and columns, a plurality of selection switches connected to the electrodes respectively, and a fingerprint sensing control circuit for switching the selection switches to control connections between the electrodes, the method comprising:
the fingerprint sensing control circuit dividing the electrodes through the selection switches sequentially or dynamically into at least four blocks, the four block being a sense receiving block, a first deflection focusing block, a second deflection focusing block, and a sense transmitting block, wherein the first deflection focusing block is comprised of electrodes surrounding the sense receiving block, the second deflection focusing block is comprised of electrodes surrounding the first deflection focusing block, and the sense transmitting block is comprised of electrodes surrounding the second deflection focusing block;
the fingerprint sensing control circuit applying a sensing stimulation signal to the electrodes of the sense transmitting block;
the fingerprint sensing control circuit applying a deflection focusing signal with a same phase as that of the sensing stimulation signal to the electrodes of the second deflection focusing block;

the fingerprint sensing control circuit applying a reference voltage or grounding signal to the electrodes of the first deflection focusing block; and the fingerprint sensing control circuit inputting a sensing signal on electrodes of the sense receiving block to a detection circuit for detecting a fingerprint signal.

34. The biometric feature identification method as claimed in claim 33, wherein the sensing stimulation signal is an AC signal.

35. The biometric feature identification method as claimed in claim 33, wherein the fingerprint sensing control circuit applies the sensing stimulation signal to pass through a circuit for generating a deflective focus signal.

36. The biometric feature identification device as claimed in claim 15, wherein the selection switches couple electrical signal on one selected sensing electrode group to an input terminal of at least one signal amplifier with a positive gain corresponding to the selected sensing electrode group, and couple output signal of the at least one signal amplifier with a positive gain to one first deflection electrode group corresponding to the selected sensing electrode group.

37. The biometric feature identification device as claimed in claim 15, wherein the selection switches couple electrical signal on one selected sensing electrode group to an input terminal of at least one signal amplifier with a negative gain corresponding to the selected sensing electrode group, and couple output signal of the at least one signal amplifier with a negative gain to one second deflection electrode group corresponding to the selected sensing electrode group.

* * * * *